US009313762B2

(12) United States Patent
Ben Hamida et al.

(10) Patent No.: US 9,313,762 B2
(45) Date of Patent: Apr. 12, 2016

(54) METHOD AND APPARATUS FOR THE COOPERATIVE LOCALIZATION OF TRANSMITTERS AND/OR RECEIVERS ON A MOBILE BODY

(75) Inventors: Elyes Ben Hamida, Grenoble (FR); Benoit Denis, Grenoble (FR); Laurent Ouvry, Le Versoud (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 671 days.

(21) Appl. No.: 13/824,927

(22) PCT Filed: Aug. 22, 2011

(86) PCT No.: PCT/EP2011/064393
§ 371 (c)(1),
(2), (4) Date: May 6, 2013

(87) PCT Pub. No.: WO2012/034830
PCT Pub. Date: Mar. 22, 2012

(65) Prior Publication Data
US 2013/0225200 A1 Aug. 29, 2013

(30) Foreign Application Priority Data
Sep. 16, 2010 (FR) ...................................... 10 57424

(51) Int. Cl.
*G01S 3/02* (2006.01)
*H04W 64/00* (2009.01)
*G01S 5/02* (2010.01)

(52) U.S. Cl.
CPC ............. *H04W 64/00* (2013.01); *G01S 5/0289* (2013.01)

(58) Field of Classification Search
CPC .............................. H04W 64/00; G01S 5/0289

USPC ........................................................ 342/463
See application file for complete search history.

(56) References Cited

U.S. PATENT DOCUMENTS 8,055,021 B2 11/2011 Caritu et al.
2002/0055362 A1 5/2002 Aoyama
(Continued)

FOREIGN PATENT DOCUMENTS

EP 1207404 A1 5/2002
EP 1617601 A2 1/2006
(Continued)

OTHER PUBLICATIONS

M. Maman, et al., "Evaluating a TDMA MAC for Body Area Networks Using a Space-time Dependent Channel Model", The 20th Personal, Indoor and Mobile Radio Communications Symposium, Sep. 2009, pp. 2101-2105, IEEE.
Davide Macagnano, et al, "MAC Performances for Localization and Tracking in Wireless Sensor Networks", In Proceedings of the 4th Workshop on Positioning, Navigation and Communication, Mar. 2007, pp. 297-302, IEEE.
(Continued)

*Primary Examiner* — Frank J McGue
(74) *Attorney, Agent, or Firm* — Baker & Hostetler LLP

(57) ABSTRACT

A method and a device for cooperative location of a first node possessed by a first mobile body comprising several nodes able to transmit and/or receive a signal by wireless means, comprises a step of measurements of distances separating the first node from second nodes, each of the second nodes being possessed by one of the following entities chosen from among: the first mobile body, a remote fixed apparatus and a second mobile body both situated within transmission range of the said mobile body, at least two nodes from among all the second nodes used to perform the distance measurements being possessed by two entities of distinct types and/or by the second mobile body, a step making it possible to utilize the measurements so as to locate at least the first node at least in relation to some of the second nodes.

8 Claims, 19 Drawing Sheets

(56) References Cited

U.S. PATENT DOCUMENTS

| | | |
|---|---|---|
| 2005/0143101 A1 | 6/2005 | Kyperountas et al. |
| 2006/0267841 A1 | 11/2006 | Lee et al. |
| 2007/0225016 A1 | 9/2007 | Jendbro et al. |
| 2008/0077326 A1 | 3/2008 | Funk et al. |
| 2008/0102855 A1 | 5/2008 | Forbes et al. |
| 2008/0223131 A1 | 9/2008 | Vannucci et al. |
| 2008/0232281 A1 | 9/2008 | Pahlavan et al. |
| 2008/0268873 A1 | 10/2008 | Wymeersch et al. |
| 2009/0046005 A1 | 2/2009 | Namineni et al. |
| 2009/0209268 A1 | 8/2009 | Ha et al. |

FOREIGN PATENT DOCUMENTS

| | | |
|---|---|---|
| EP | 1760487 A1 | 3/2007 |
| WO | 2004095714 A2 | 11/2004 |
| WO | 2005/096568 A1 | 10/2005 |
| WO | 2007/093641 A2 | 8/2007 |
| WO | 2008/143379 A1 | 11/2008 |
| WO | 2009/078509 A1 | 6/2009 |

OTHER PUBLICATIONS

Neal Patwari, et al., "Locating the Notes: Cooperative Localization in Wireless Sensor Networks", IEEE Signal Processing Magazine, Jul. 2005, pp. 54-69, vol. 54.

C.P Figueiredo, et al., "3D Localization for Biomedical Wireless Sensor Networks Using a Microantenna", European Conference on Wireless Technology, 2008, pp. 45-48.

Cheng Guo, et al., "Improving Accuracy of Person Localization with Body Area Sensor Networks: An Experimental Study", Consumer Communications and Networking Conference, 2009, pp. 1-5, IEEE.

Hongliang Ren, et al., "IndoorPatient Position Estimation Using Particle Filtering and Wireless Body Area Networks", Proceedings of the 29th Annual International Conference of the IEEE Engineering in Medicine and Biology Society, Aug. 23-26, 2007, pp. 2277-2280.

Cheolhyo Lee, et al., "Performance of a One-Way Ranging Method for WBAN Healthcare Services", 9th International Symposium on Communications and Information Technology, 2009, pp. 1460-1463.

Francesco Chiti, et al., "An Integrated Communications Framework for Context Aware Continuous Monitoring with body Sensor Networks", IEEE Journal on Selected Areas in Communications, May 2009, vol. 27, No. 4.

METHOD AND APPARATUS FOR THE COOPERATIVE LOCALIZATION OF TRANSMITTERS AND/OR RECEIVERS ON A MOBILE BODY

CROSS-REFERENCE TO RELATED APPLICATIONS

This application is a National Stage of International patent application PCT/EP2011/064393, filed on Aug. 22, 2011, which claims priority to foreign French patent application No. FR 1057424, filed on Sep. 16, 2010, the disclosures of which are incorporated by reference in their entirety.

FIELD OF THE INVENTION

The present invention relates to a method and a device for cooperative location of transmitters and/or receivers possessed by a mobile body. The invention applies notably to motion capture, to the locating of people, to the automatic deployment of body networks, or else to navigational aid.

BACKGROUND

With the recent technological advances in regard to integration and miniaturization, and by virtue of the development of low bitrate and very low consumption wireless communication technologies, a new application field has emerged by the name of wireless body networks or BAN, the acronym standing for "Body Area Networks". Hereinafter the terms "body network" and "BAN" will be employed interchangeably. In this type of application, wireless transmission and/or reception elements are intended to form a network on or in very close proximity to a human body. Known applications of these networks are notably the "exploded terminal" (comprising screens, keyboards, and earpieces, not co-located), sports apparatus (cardio-frequency meter, watch, pedometer on a shoe) or medical apparatus (nomadic monitoring of cardiac, cerebral and muscular activity, for example).

The locating of the wireless devices constituting a BAN is of interest in numerous applications such as:
  navigation of groups of people moving around indoors and geo-located services;
  motion capture, for example, for the tracking of sports movements or for entertainment and games applications;
  posture detection, for example, for rehabilitation, the tracking of vulnerable or elderly people, and the surveillance of people operating in a disaster-stricken environment, for example firemen operating inside a blazing building.

Radiolocation has been studied in the context of wireless personal networks or WPANs ("Wireless Personal Area Networks") and networks of sensors or WSN ("Wireless Sensor Networks") and multiple solutions for cooperative location have been proposed as alternatives or supplements to satellite location systems. The publication by N. Patwari, J. N. Ash, S. Kyperountas, A. O. Hero, R. L. Moses, and N. S. Correal, "Locating the nodes: cooperative localization in wireless sensor networks," Signal Processing Magazine, IEEE, vol. 22, Jul. 2005, pp. 54-69 may notably be cited. These location solutions are generally based on measurements of distance between each pair of nodes, and make it possible to estimate the positions, relative or absolute, of each node.

More recently, techniques have been proposed for dealing with the problem of location within the framework of wireless body networks or WBANs.

Thus, in the procedure proposed by C. P. Figueiredo, N. S. Dias, and P. M. Mendes, "3D localization for biomedical wireless sensor networks using a microantenna," Wireless Technology, 2008. EuWiT 2008. European Conference on, 2008, pp. 45-48, the authors are concerned with the problem of locating electrodes positioned on a body. The proposed procedure is based on the use of low-frequency radio technology, to better cope with the attenuations caused by the body, as well as the use of a positioning algorithm called SPA (for Self Positioning Algorithm). This algorithm is based on the measurements of distance between the various electrodes, obtained by virtue of the metric of the RSSI (for Receive Signal Strength Indicator) and the use of an MEMS (for Micro Electrical Mechanical Systems) micro-antenna of cantilever type. On the basis of the measurements obtained, the SPA algorithm estimates, by means of the least squares procedure, the position of each of the electrodes in a virtual coordinate system. However, this procedure implements exhaustive measurements of distance between each pair of objects. Moreover, the positioning is purely virtual and is limited to applications of the type involving auto-organization and auto-discovery of the network topology. Finally, this procedure is based on the metric (rather inaccurate) of the RSSI.

In C. Guo, J. Wang, R. V. Prasad, and M. Jacobsson, "Improving the Accuracy of Person Localization with Body Area Sensor Networks: An Experimental Study," Consumer Communications and Networking Conference, 2009. CCNC 2009. 6th IEEE, 2009, pp. 1-5, the authors propose and experimentally evaluate a procedure for locating wireless body networks indoors. Since the antennas are generally not perfectly omnidirectional, the authors propose the idea of distributing several wireless objects over the body, so as to utilize spatial diversity and thus improve the accuracy of location. Measurements of distance are obtained between each object of the wireless body network and exterior apparatus (also called anchors) by virtue of the metric of the RSSI (for Receive Signal Strength Indicator). Since several values of RSSI are obtained for one and the same body network, two positioning procedures are then proposed. The first procedure is based on the calculation of a mean RSSI value for the body network as a whole. The second procedure is based on the calculation of a mean position obtained on the basis of the various positions estimated by each of the wireless objects. However, even though this solution utilizes spatial diversity, by distributing several wireless objects over a person, the cooperation scheme is limited since the distance measurements are performed only between the objects and anchors, and this may lead to insufficient accuracy and/or coverage.

In H. Ren, M. Q. Meng, and L. Xu, "Indoor Patient Position Estimation Using Particle Filtering and Wireless Body Area Networks," Engineering in Medicine and Biology Society, 2007. EMBS 2007. 29th Annual International Conference of the IEEE, 2007, pp. 2277-2280, the authors propose a technique for positioning body networks or BANs, where each BAN consists of a single wireless node. This technique is based on the RSSI metric and the use of a particle filter which makes it possible to combine: 1) the measurements of RSSI obtained on the basis of anchors or of other BANs within communication range; as well as 2) the corresponding transmission powers, so as to estimate the position of each wireless body network. However, in this procedure, the BANs consist only of a single wireless node, this not making it possible to implement complex cooperation schemes. Finally, the metric used (RSSI) is rather inaccurate.

In C. Lee, H. Lee, and J. Kim, "Performance of a one-way ranging method for WBAN healthcare services," Communications and Information Technology, 2009. ISCIT 2009. 9th International Symposium on, 2009, pp. 1460-1463, the authors evaluate the performance of a location technique which is based on the metric of the TDOA (for Time Difference Of Arrival) and an exchange of 1-way ranging type between a body network consisting of a single wireless node and a set of anchors whose positions are known. The least squares procedure is then used to estimate the position of each body network. However, this solution does not implement any cooperative schemes during location.

In F. Chiti, R. Fantacci, F. Archetti, E. Messina, and D. Toscani, "An Integrated Communications Framework for Context Aware Continuous Monitoring with Body Sensor Networks", IEEE Journal on Selected Areas in Communications, vol. 27, No. 4, May 2009, the authors propose a "framework" for the support of medical applications. This system is based on a wireless body network, composed of several objects and a node CH (for Cluster Head), and a network of sensors deployed at the level of the immediate environment. This network of sensors is mainly used by the node CH so as to be able to exchange medical information and to locate itself. Location is performed by virtue of the estimation of the metric DoA (for Direction of Arrival) between the node CH and the nodes of the network of sensors. These measurements of DoA combined with the transmission powers are then used by an algorithm, based on particle filters and dynamic Bayesian networks, for estimating the position of the node CH. However, here again, this technique does not utilize the specifics of body networks. Indeed, only one of the nodes of the BAN (the cluster head) interacts with the infrastructure (networks of sensors in the current case) so as to be able to locate itself. No cooperation scheme of Intra or Inter BANs type is used. Moreover, the distance measurement is based on the RSSI metric and the direction of arrival.

Certain techniques tackle cooperative location in wireless networks and more particularly location, tracking and motion capture of wireless body networks or of nodes placed on a human body.

A first series of techniques is directed mainly at the issue of the cooperative location of mobile or stationary terminals in a wireless network. The American patent application referenced under the publication number US 2008/0268873, the international patent application published under the number WO 2004/095714, European patent application EP 1 207 404, and the American patent applications published under the numbers US 2007/0225016, US 2008/0232281, and US 2002/0055362 may notably be cited. The cooperative schemes proposed are based mainly, on the one hand, on radio communications between the terminals and anchors (or base stations) whose positions are known, and on the other hand, on radio communications between the various terminals.

A second series of techniques is directed more particularly at the issue of the positioning and/or tracking of people indoors and/or outdoors, as well as at motion capture by means of devices placed on a body.

Thus, the techniques presented in the international patent applications published under the numbers WO 2008/143379 and WO 2005/096568 implement non-cooperative tracking and locating procedures. The tracking of a person under surveillance, outdoors, is performed by virtue of a GPS and GSM module disposed on a body. Indoors, the positioning is carried out by virtue of a radio module disposed on a person and which communicates with a base station linked to the local network. However, these techniques do not generally make it possible to obtain accurate location and/or good location coverage.

The technique presented in patent application US 2008/0077326 consists of a system and a procedure allowing the location and the tracking of people operating on sites with risks where GPS is not available. Each person (or BAN) is equipped, inter alia, with a radio module so as to be able to communicate with the base stations or the other people in geographical proximity. Measurements of distance, between the BANs and to the anchors, are performed by virtue of the RSSI metric and make it possible to locate and to track the displacement of people inside the disaster-stricken zone.

The procedure presented in American patent application US 2008/0223131 uses a system based on ultra-sounds to capture the motion of a mobile person or object. A person is equipped with ultra-sound transmitters and receivers, which are themselves linked by cable to a central apparatus. Distance measurements are obtained by virtue of exchanges between the transmitters and receivers. These measurements are subsequently refined with data arising from inertial sensors, thus ultimately making it possible to capture the movements of the person or to detect certain postures. However, this procedure presented undertakes distance measurements in an exhaustive manner, thus requiring a large number of signal transmissions. Moreover, this procedure sometimes turns out to be insufficient in terms of coverage and/or accuracy.

The invention presented in the international patent application published under the number WO 2007/093641 pertains to an autonomous system for determining information representative of the motion of an articulated chain comprising at least two solid elements and at least one articulation linking the said two elements. The system comprises at least two devices for measuring inter-device distances, mounted fixedly on two distinct elements of the said articulated chain and adapted to transmit the measurements performed. Furthermore, the system comprises calculation means, mounted on the said articulated chain, adapted for calculating information representative of the motion of the said articulated chain on the basis of the measurements. However, this system is focused on the direct inter-device distance, the system comprises a constraint in that the devices are placed at very specific spots in order to determine the motion of articulations, and it is limited to motion capture or reproduction applications.

Thus, in the context of wireless body network location applications, the majority of the existing solutions are based on networks composed of a single wireless object as well as on fairly simple cooperation schemes. Indeed, cooperation between the objects of one and the same BAN network (intra-BAN cooperation) is nonexistent, and cooperation between various BAN networks (inter-BAN cooperation) is limited to measurements of distance between two wireless objects, which are generally chosen as being cluster head or coordinator nodes.

Moreover, in the context of applications of auto-organization or motion capture type, the cooperation schemes are based on carrying out exhaustive measurements of distance between each pair of wireless objects of one and the same BAN. Inter-BAN cooperation is furthermore nonexistent and the positioning of these objects is generally of virtual type.

Ultimately, it is apparent after analysis that the majority of the solutions proposed in the context of location, auto-organization or motion capture of wireless body networks, implement only fairly simplistic Inter-BAN cooperation schemes (for example, a measurement of distance between just two nodes) or Intra-BAN cooperation schemes with exhaustive distance measurements without any consideration for the performance aspects of the MAC layer. Furthermore, none of the already existing solutions makes it possible to simultaneously combine various types of Intra-BAN, Inter-BAN and Anchor-BAN measurements.

SUMMARY OF THE INVENTION

An aim of the invention is to propose a method for reliably and accurately locating transmitter and/or receiver devices disposed on a mobile body, for example an articulated mobile living body, such as a human or animal body, or an inorganic body, such as a robot or a self-guided vehicle. For this purpose, the subject of the invention is a method of cooperative location of a plurality of nodes possessed by a first mobile body comprising several nodes able to transmit and/or receive a signal by wireless means, the method being characterized in that it comprises, for at least one first node from among the said nodes, a step of measurements of distances separating the said first node from second nodes by using the said wireless means, each of the said second nodes being possessed by one of the following distinct type entities, by choice:
 the first mobile body,
 a remote fixed apparatus situated within transmission range of the said mobile body,
 a second mobile body, remote and situated within transmission range of the first mobile body,
 at least two nodes from among all the said second nodes used to perform the said distance measurements being possessed by two entities of distinct types and/or by the said second mobile body, the method comprising a step of utilizing the said measurements to locate at least the said first node at least in relation to a subset of the said second nodes, the method furthermore comprising a step of locating at least one other of the said nodes possessed by the body by utilizing at least one measurement of distance separating this other node from a third node, it being possible for this third node to be the said first node.

The method according to the invention makes it possible to mobilize a certain number of wireless linkups, for example based on Ultra Wide Band (UWB) radio technology, and of measurements of distances (by virtue of cooperative schemes that are not present in the state of the art) for any(all) useful purpose(s) for location, in the most generic sense of the term (that is to say relative positioning, absolute positioning, or to obtain a simple additional relative distance item of information).

The wireless objects placed on the mobile body preferably communicate by radiofrequencies, but acoustic or optical links are also possible. In the case of UWB, the radio metric which is utilized for estimating a distance separating a pair of communicating entities is the Time Of Flight or TOF. This time of flight, combined with the knowledge of the speed of the electromagnetic waves in air makes it possible to determine the distance between these two entities. The utilization of these measurements of distance by algorithms makes it possible to estimate the absolute or relative position of the objects on a body and, ultimately, the global position of a body in an indoor environment. Though UWB technology and the metrics of type TOF appear as preferential means for the invention, it should be noted that other radiolocation metrics, relying for example on the power received of the signal (RSSI) for narrowband radio technologies (such as for example Zigbee) can also be applied.

According to an implementation of the method of cooperative location according to the invention, a first step is executed to measure distances between the first node and second nodes already positioned and possessed by entities remote from the first mobile body, a second step being executed to estimate the position of the said first node on the basis of the said measurements, a third step being executed if it has not been possible to determine the position of the said first node according to the desired accuracy on completion of the second step, the third step comprising at least one measurement of distance between the first node and at least one other node possessed by the first mobile body and positioned on completion of the first step, the position of the said first node then being estimated on the basis of the measurements of distances arising from the first step and from the third step. This implementation, makes it possible to save energy when the third step is not executed. The distance measurements are selective, so as to limit the use of the calculation resources. Stated otherwise, only the nodes for which it has not been possible to determine a position, in a non-cooperative manner, implement measurements of distance to the other already positioned objects.

According to another implementation of the method of cooperative location according to the invention, a first step comprises the taking of measurements of distances between the first node and second nodes, at least one second node being possessed by the first mobile body, at least one other second node being possessed by an entity remote from the first mobile body, the method executing a second step to estimate the position of the first node on the basis of the said measurements of distances. This implementation favors the obtaining of accurate location. In this case, all the inter-BAN, intra-BAN and anchor-BAN measurements are used concomitantly.

According to another implementation of the method of cooperative location according to the invention, at least one measurement is performed of time of flight of an indirect path of ultra wideband signal transmitted between the first node and a second node, the said path arising from a single reflection, between the first node and the second node, on a surface external to the body comprising the first node, the second node belonging, by choice, to:
 the first mobile body;
 a fixed apparatus, remote and situated within transmission range of the said mobile body;
 a second mobile body, remote and situated within transmission range of the first mobile body;
utilizing the said time of flight measurement to locate the first node at least with respect to the second node.
This implementation of the method according to the invention makes it possible for the locating system to benefit from additional measurements related to reflections, for example reflections on the ground.

According to another implementation of the method of cooperative location according to the invention, the measurements of distances are performed by measurement of the time of arrival of a signal transmitted between the first node and a second node, the first node and the second node being synchronized, or of an exchange of signals transmitted between the first node and a second node, the first node and the second node being asynchronous. This metric presents notably the advantage of accuracy.

The invention also relates to a method of cooperative location of a mobile body, the method comprising, for several nodes of the said body, a first step of executing the cooperative node location method such as described above to estimate the position of the said nodes, and a second step of utilizing the said positions to locate the said mobile body. For example, the position of the mobile body can be the result of a combination of the positions of the nodes. The method according to the invention thus makes it possible to reuse, for example, an already existing network of body sensors to determine the position of nodes.

The invention also relates to a system suitable for the implementation of the cooperative node location method such as described above, the system comprising a first mobile body comprising several nodes from among which at least one node is able to transmit signals, for example an ultra wideband radiofrequency transmitter, the said node being within transmission range of at least one second node comprising a receiver able to receive the signals transmitted by the said transmitter, the first mobile body comprising means for calculating a position of the transmitter node.

According to another embodiment, the system suitable for the implementation of the cooperative node location method such as described above, the system comprises a first mobile body comprising several nodes from among which at least one node is able to receive signals, for example an ultra wideband radiofrequency receiver, the said node being within transmission range of at least one second node comprising a transmitter of signals, the system comprising means for calculating the position of the receiver node.

The method according to the invention can form the subject of multiple applications. It makes it possible to determine the position of several nodes of a BAN, with respect to a local reference datum associated with the BAN, with respect to a reference datum tied to a surrounding infrastructure or with respect to a reference datum tied to another BAN moving in geographical proximity to the first BAN. It can aid the navigation of groups of mobile BANs, allow auto-organization, auto-configuration of the nodes as a function of the position, relative or absolute, of each node with respect to the others. The method according to the invention can be used to check the integrity of a body network or else to detect certain postures of a human body. More generally, it can be employed to reconstruct the motion of the human body or of certain limbs, while optionally being aided by sensors of inertial type, these sensors possibly already being integrated into the nodes of the body network.

BRIEF DESCRIPTION OF THE DRAWINGS

Other characteristics will become apparent on reading the detailed description afforded by way of nonlimiting example which follows, given in relation to appended drawings which represent.

Figure 4A:
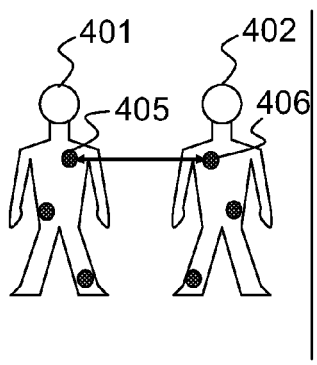
FIG. 4a, an example of simple cooperation of "1-to-1" type between two
Figure 4B:
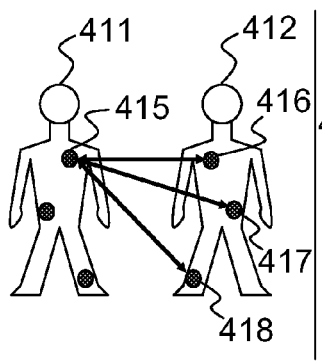
Figure 4C:
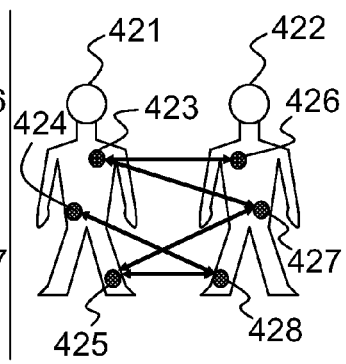
Figures 1, 4:
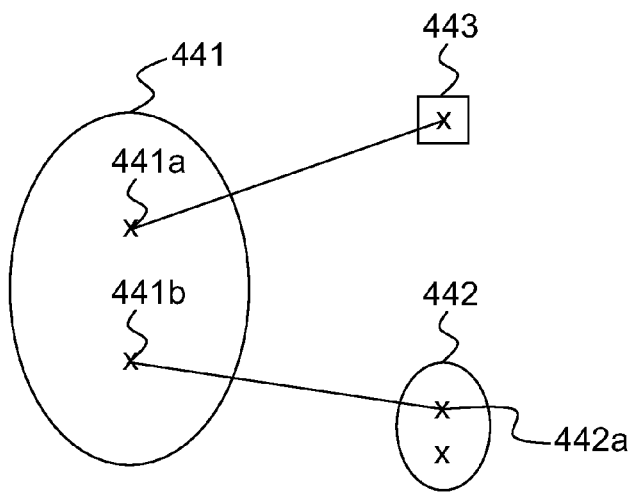
Figures 2, 4:
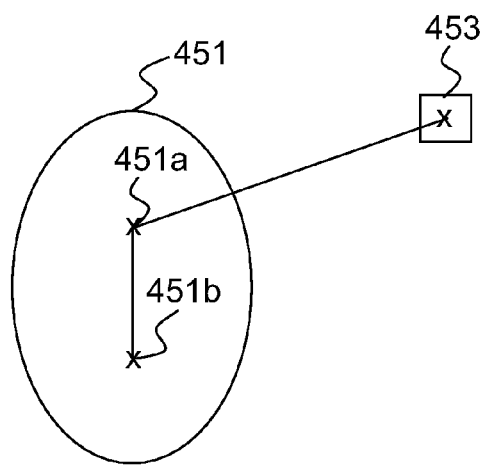
Figures 3, 4:
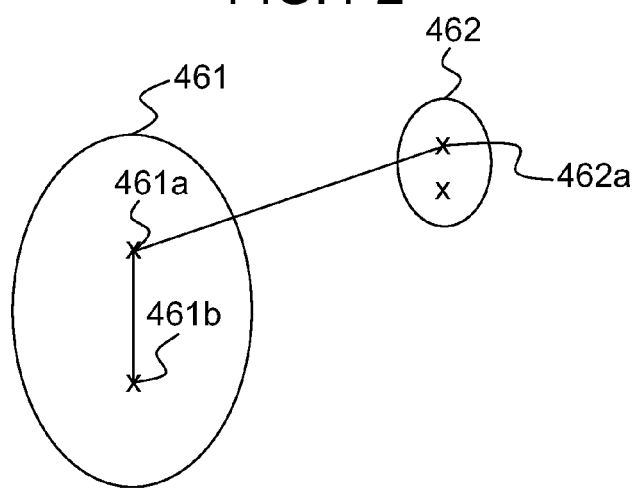
Figure 4:
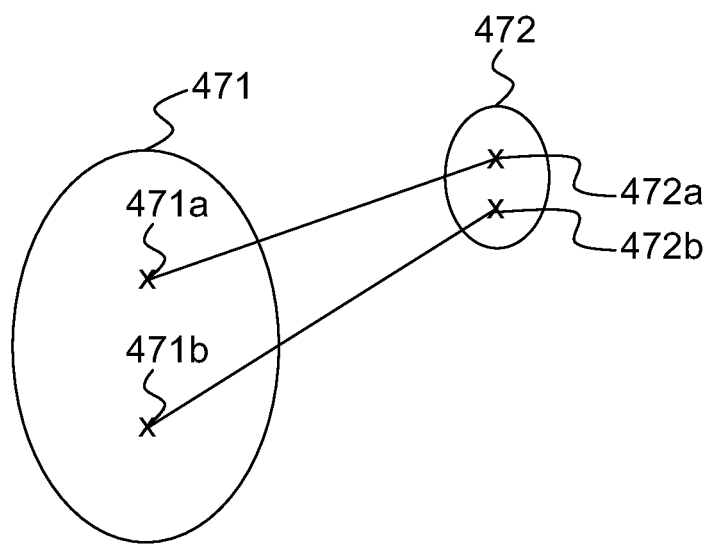
Figures 4, 5:
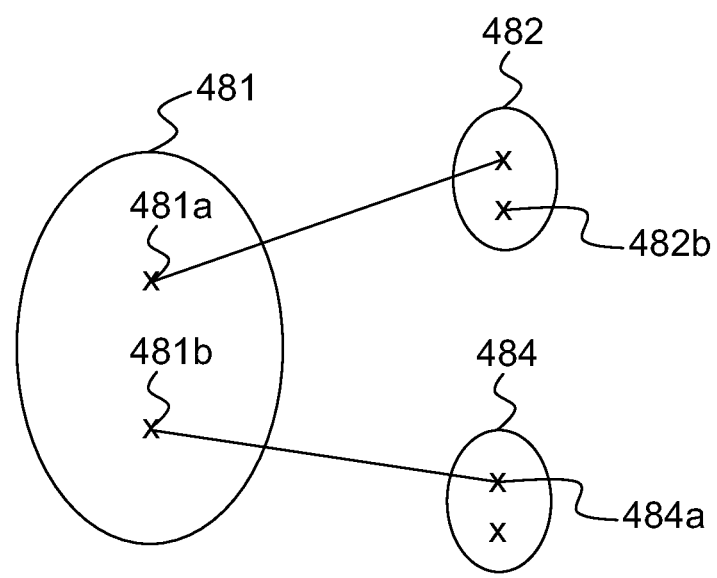
Figures 4, 5, 6:
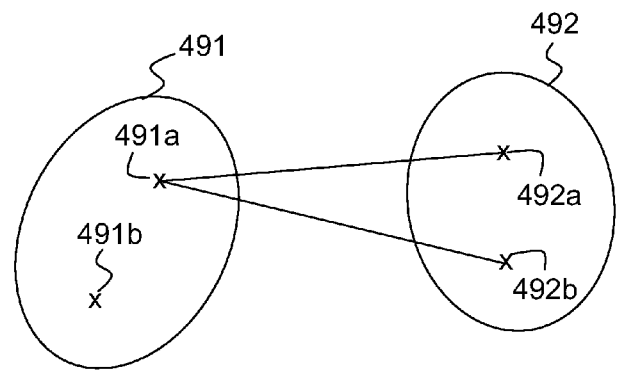
Figures 4, 5, 6, 7:
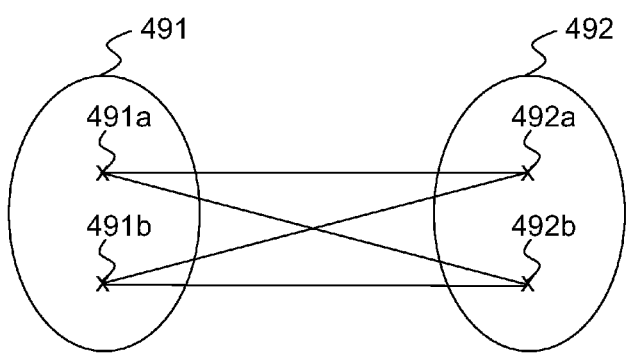
Figures 4, 5, 6, 7, 8:
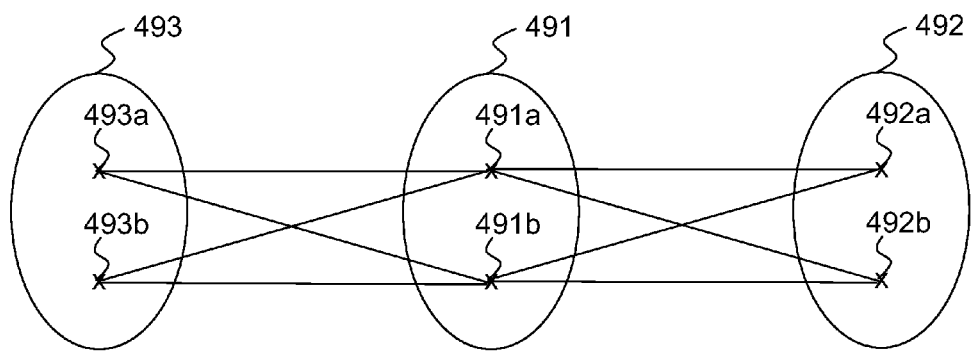
Figure 5:
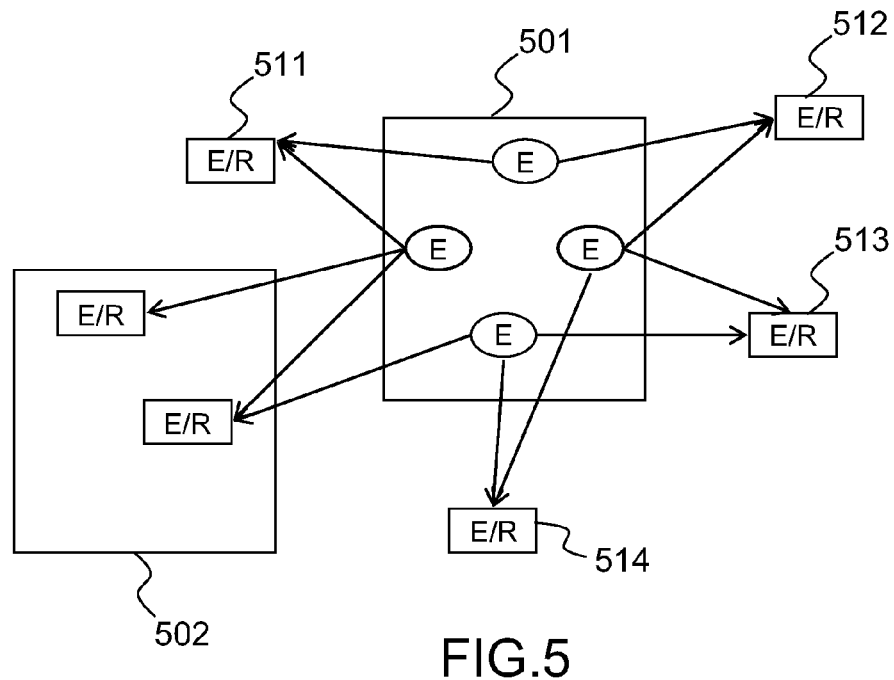
Figure 6:
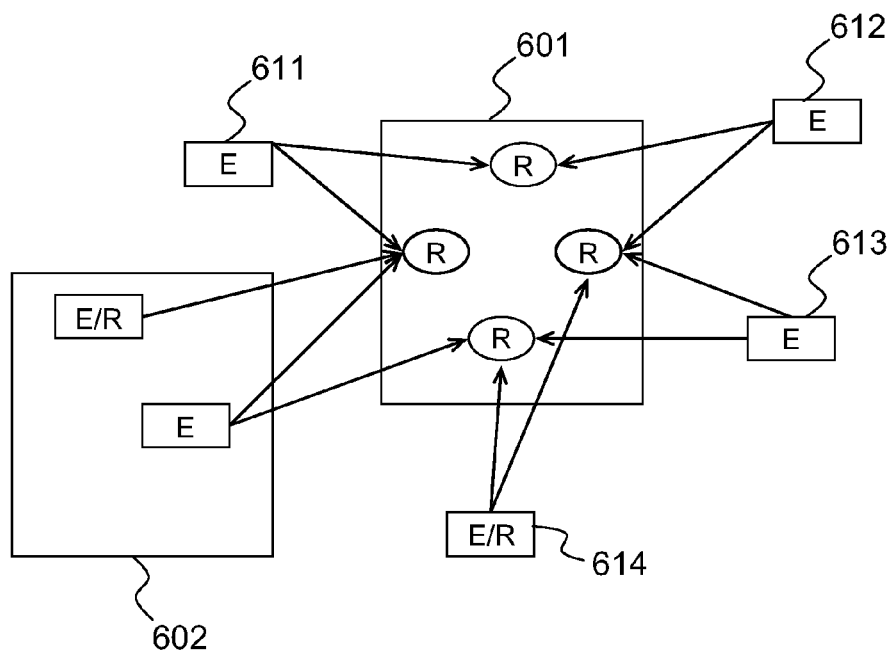
Figure 7:
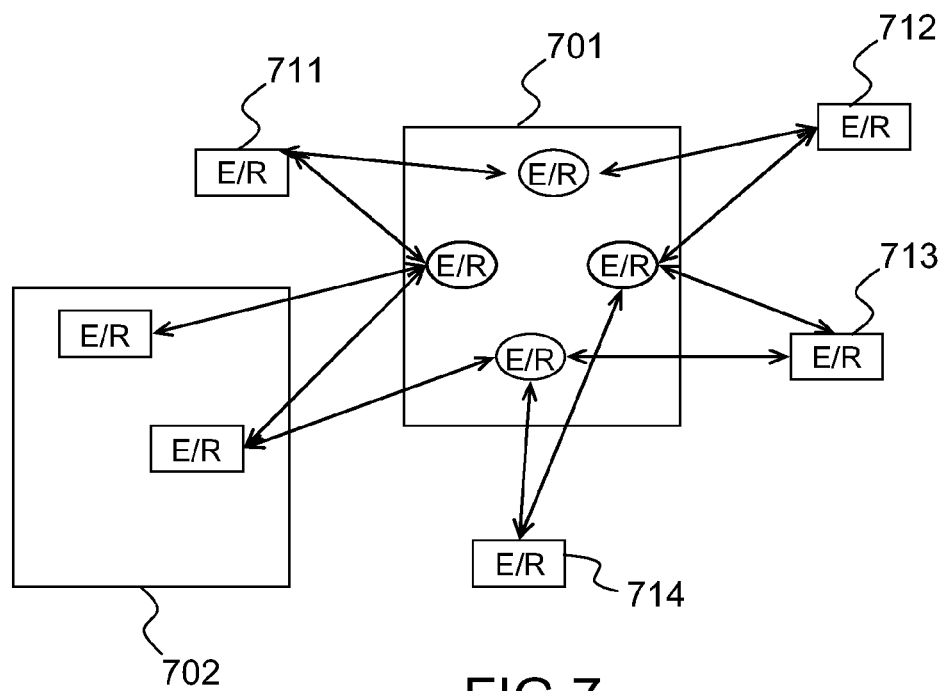
Figure 8A:
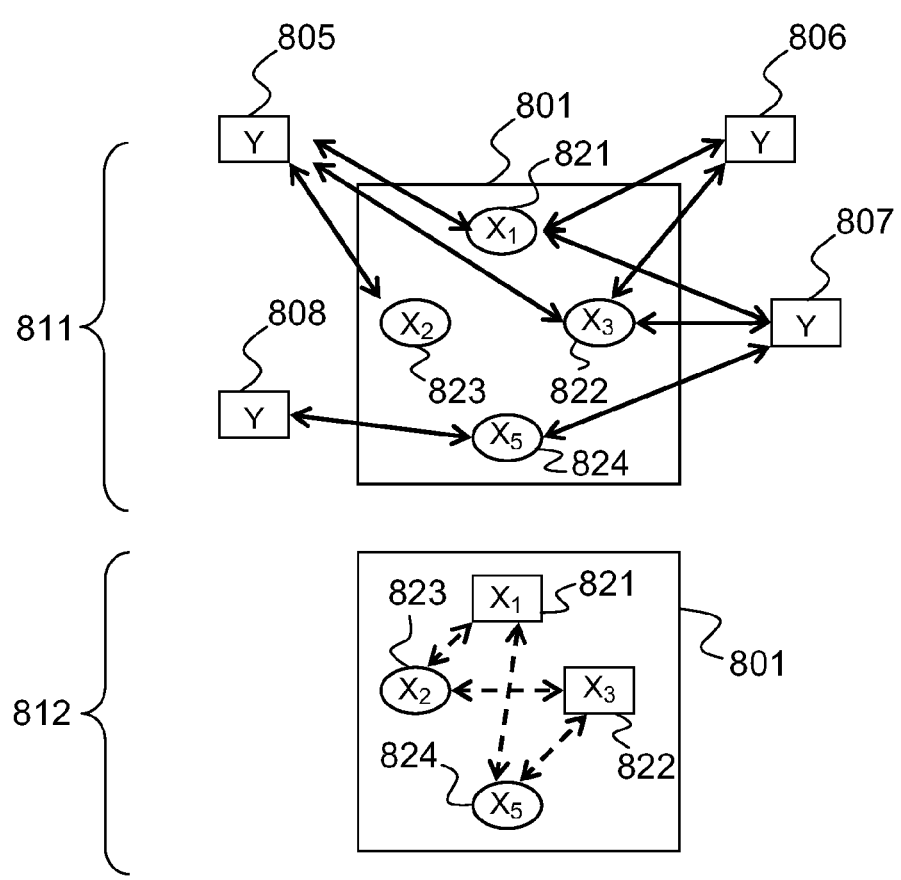
Figure 8B:
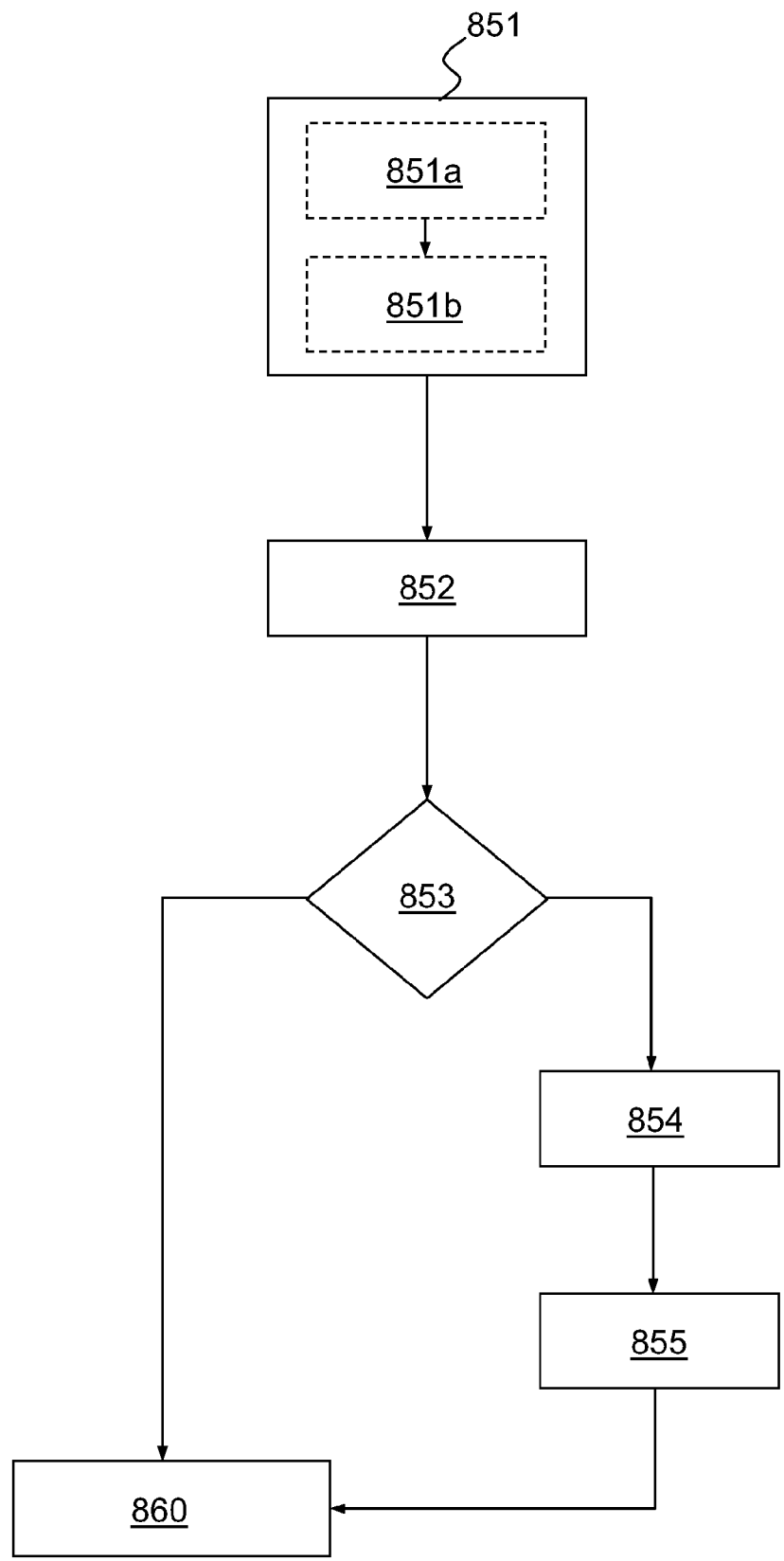
Figure 9A:
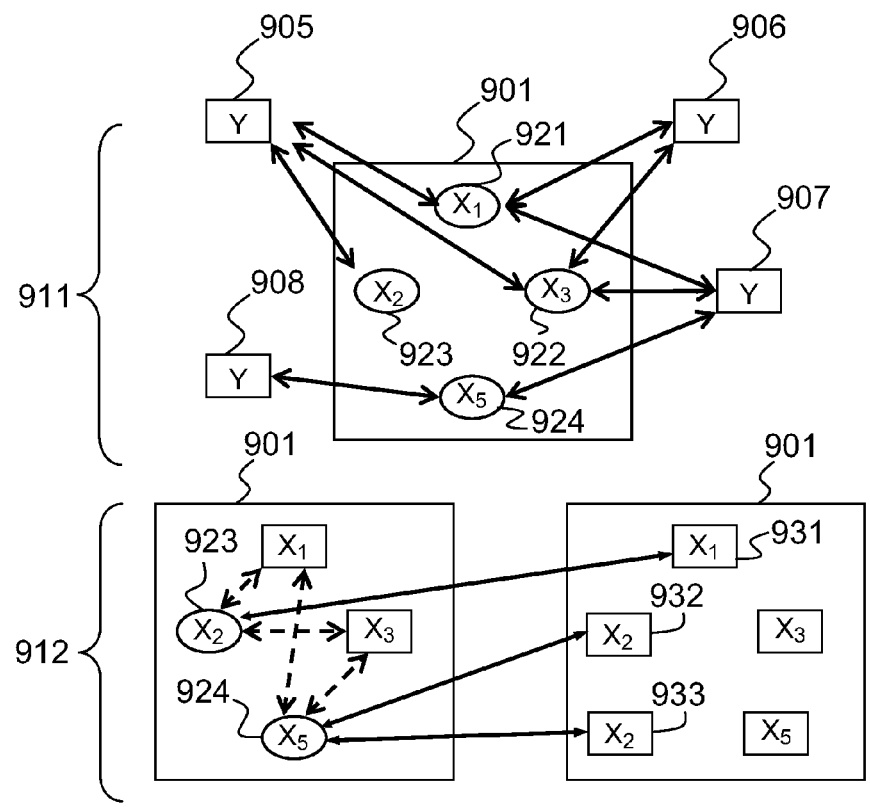
Figure 10A:
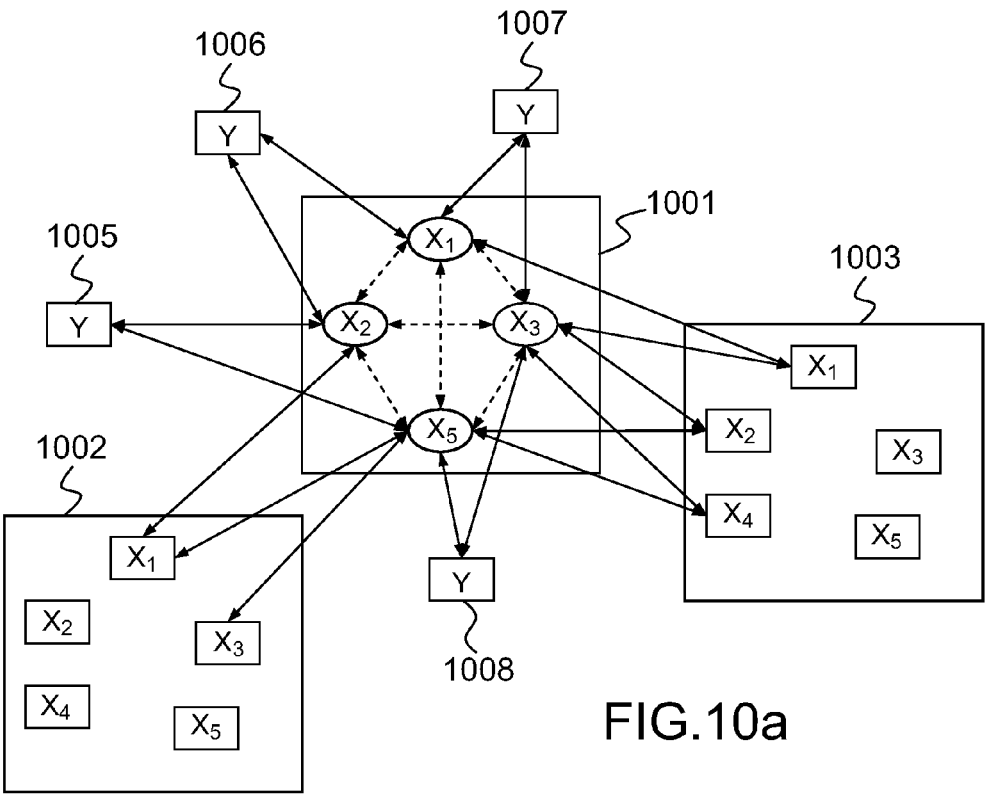
Figure 9B:
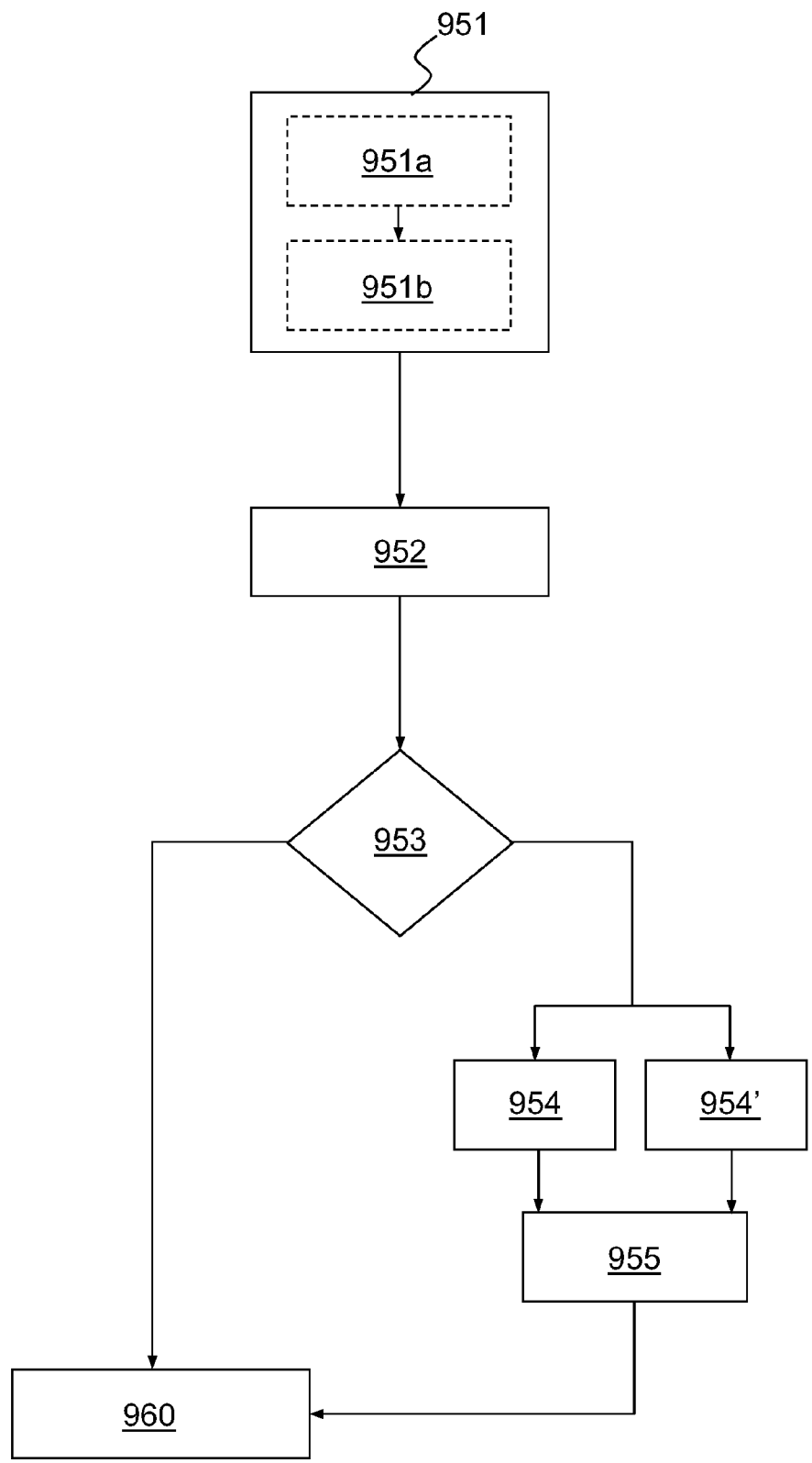
Figure 10B:
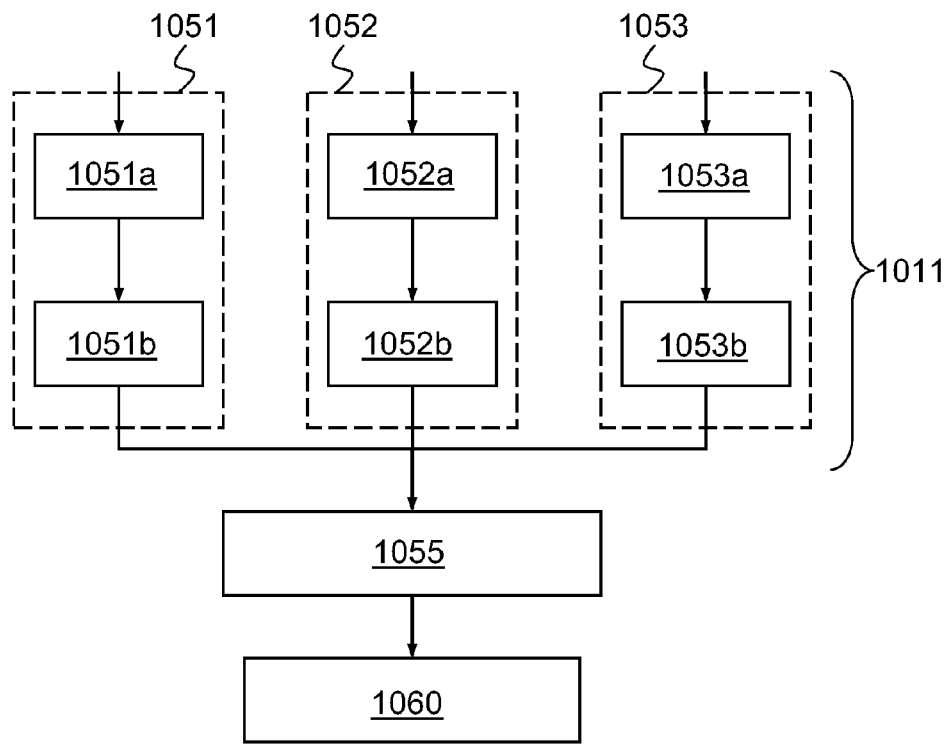
Figure 11:
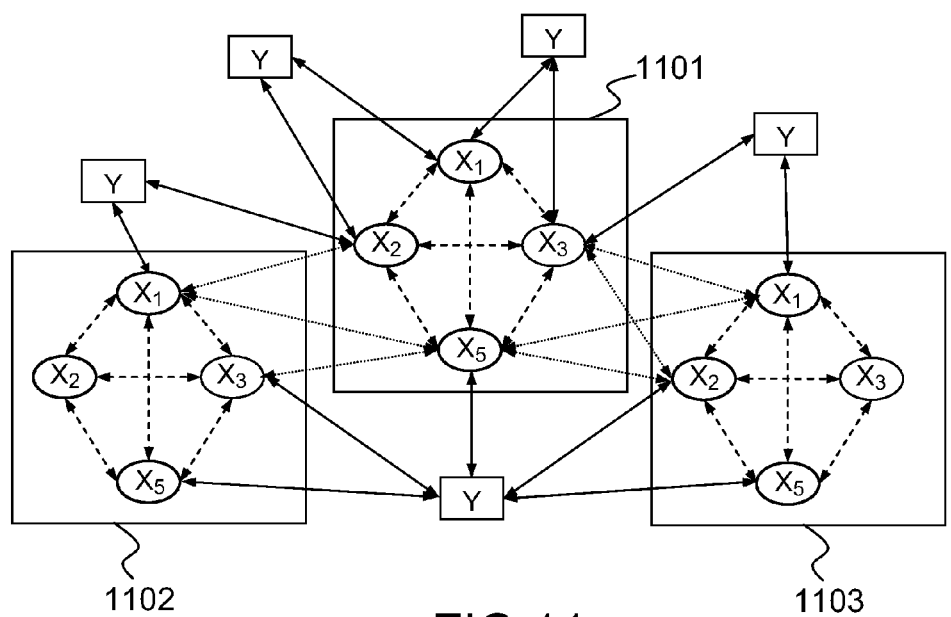
Figure 12A:
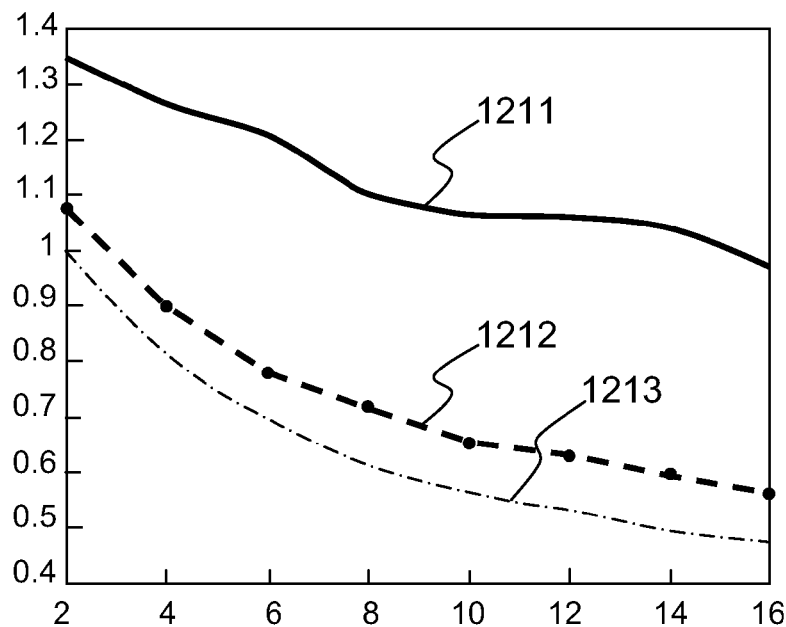
Figure 12B:
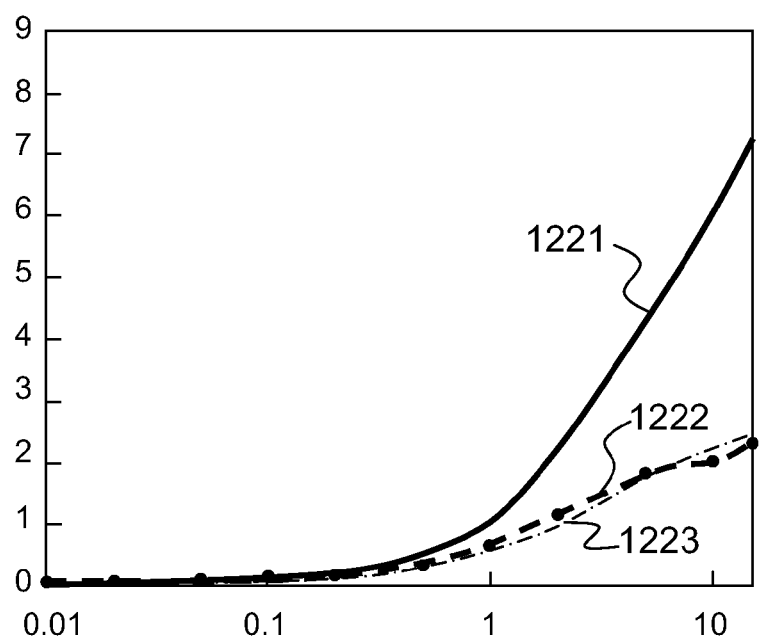
Figure 12C:
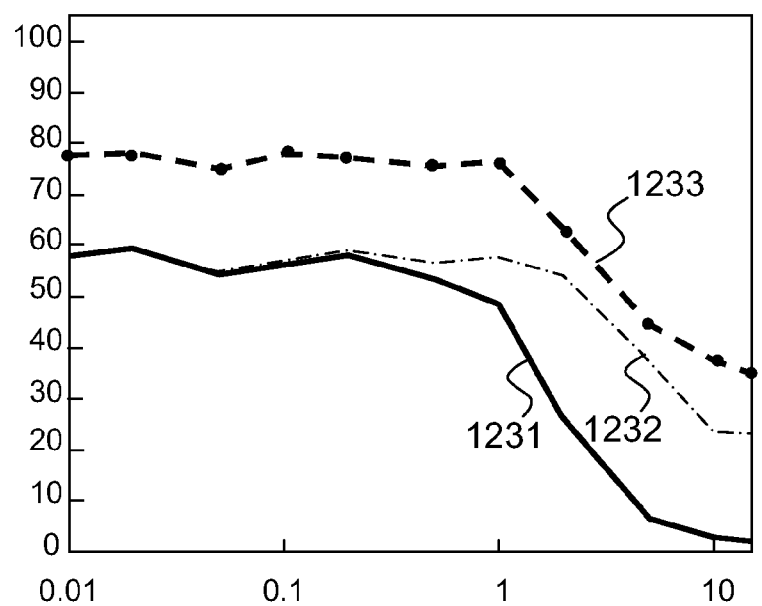
Figure 12D:
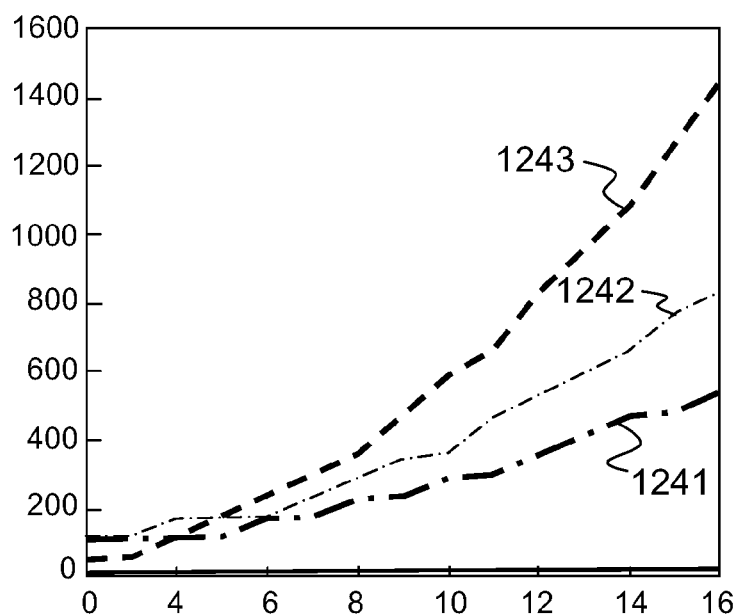
Figure 13A:
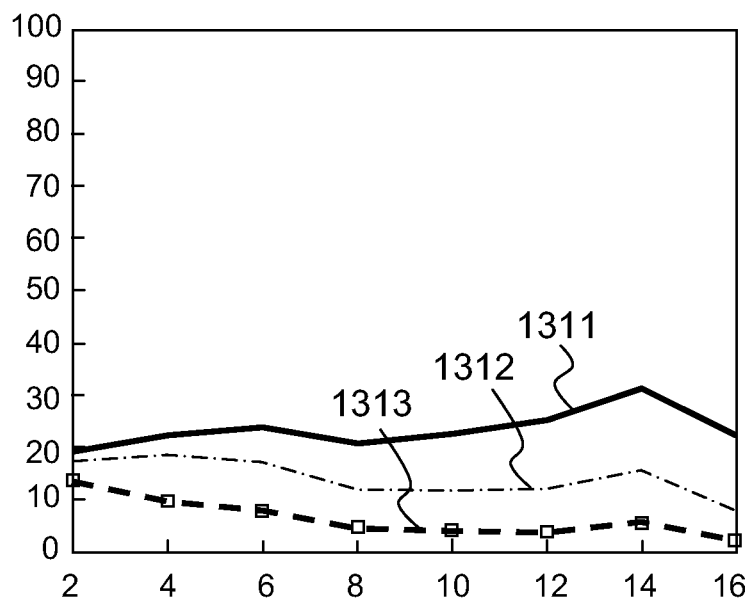
Figure 13B:
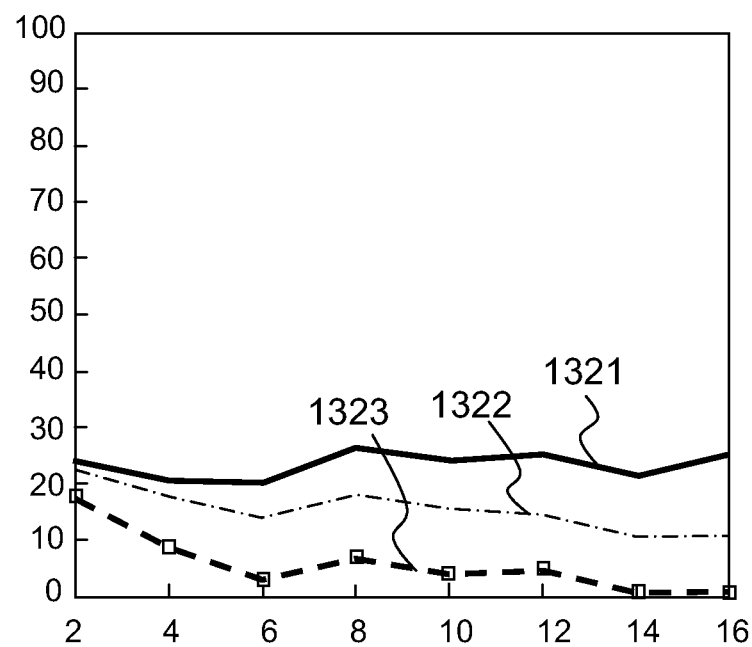
Figure 13C:
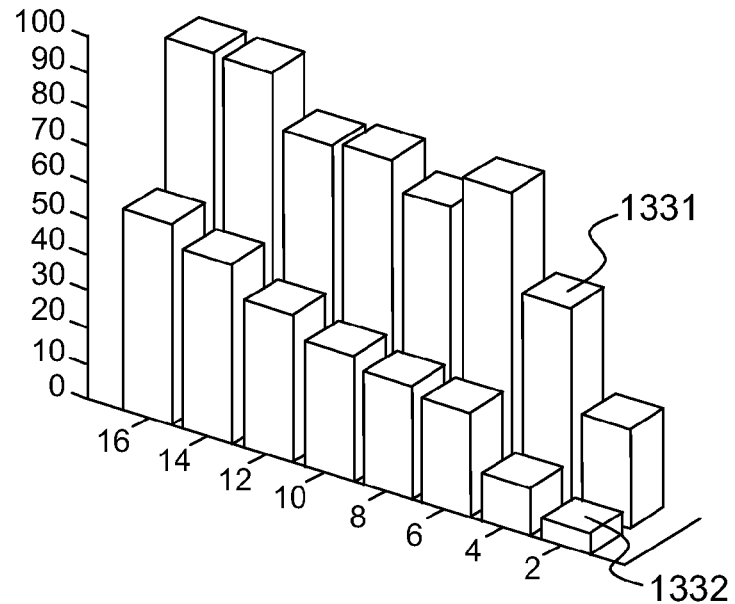
Figure 13D:
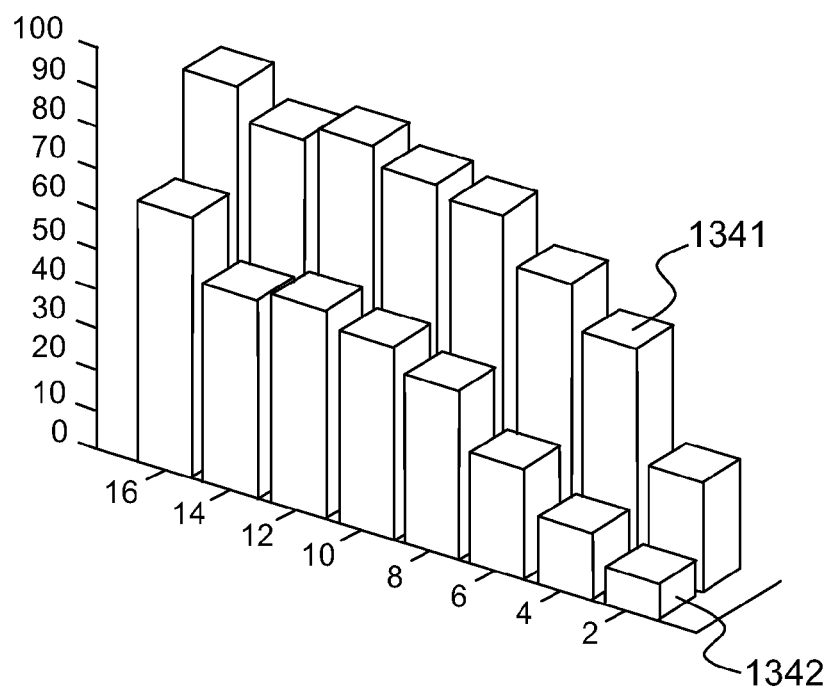
Figure 14:
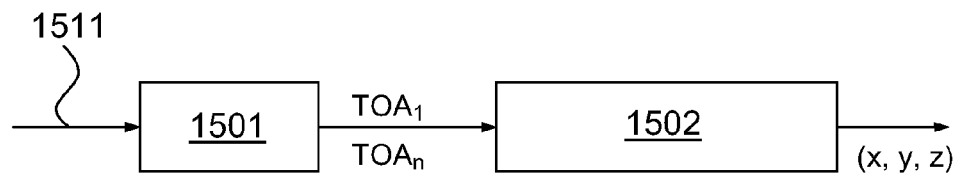
Figure 15:
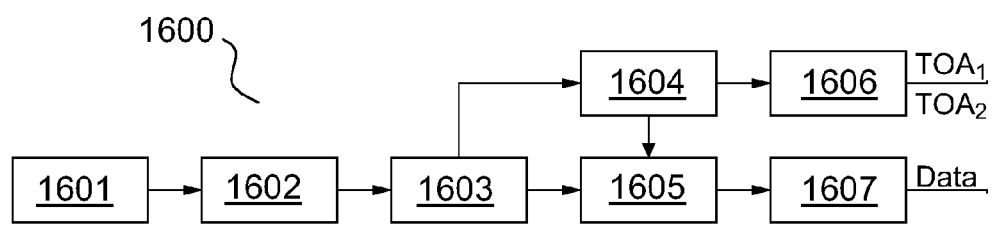
Figure 16:
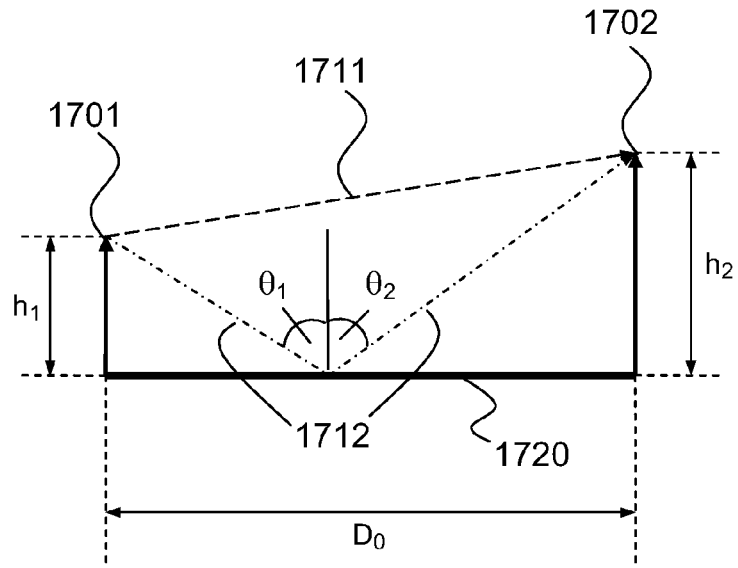
Figure 17A:
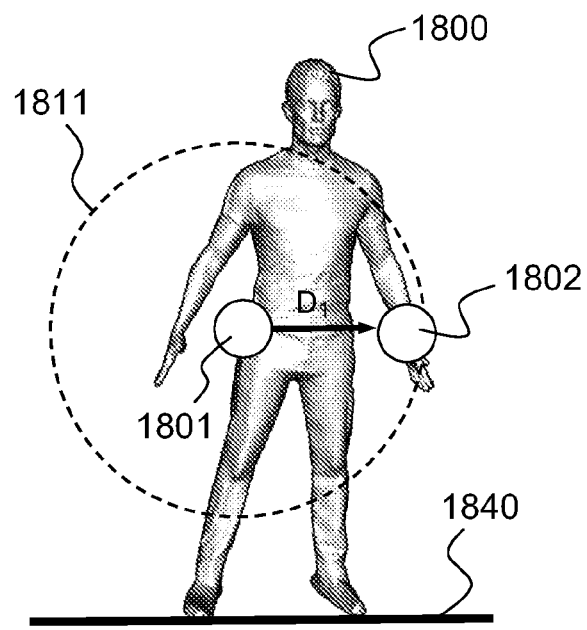
Figure 17B:
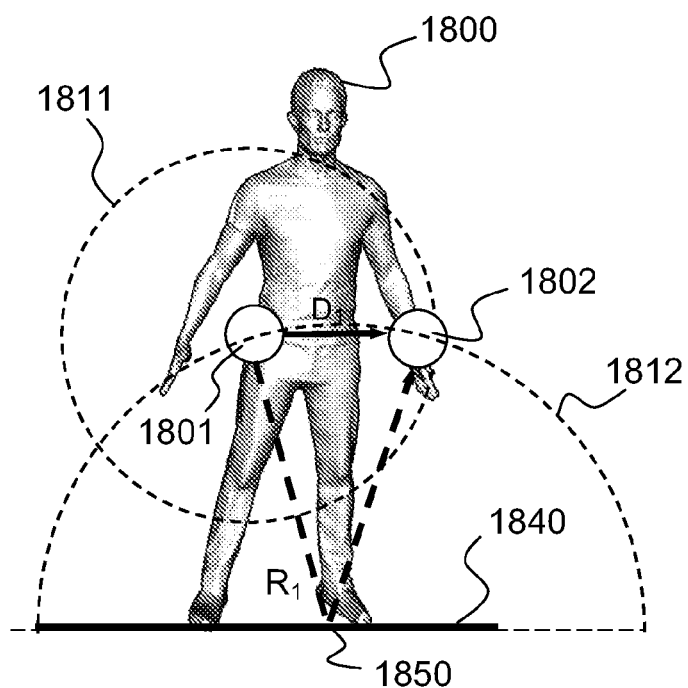
Figure 18A:
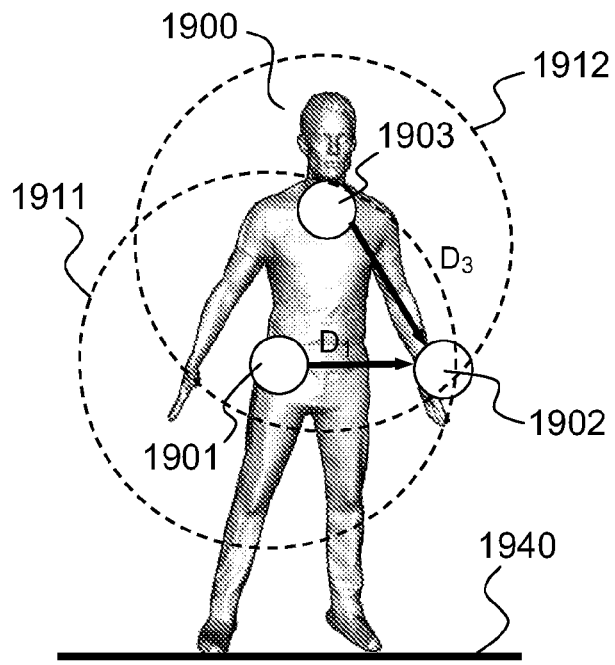
Figure 18B:
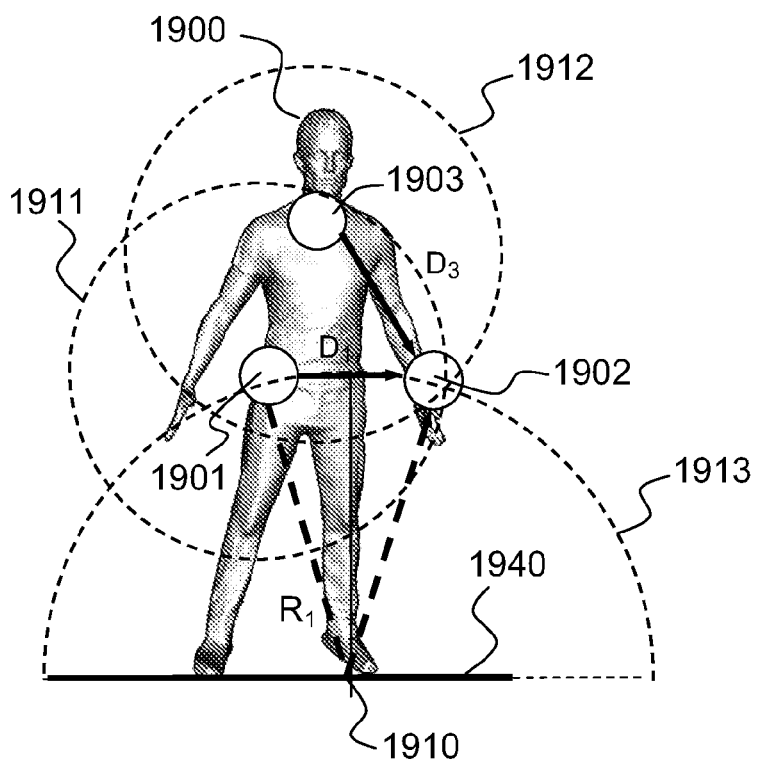
Figure 19:
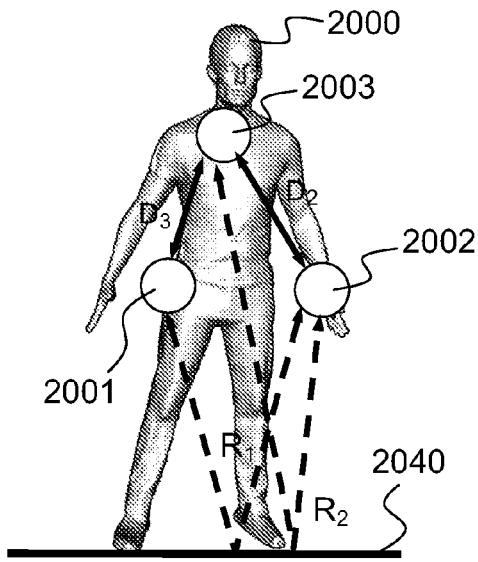
Figure 20A:
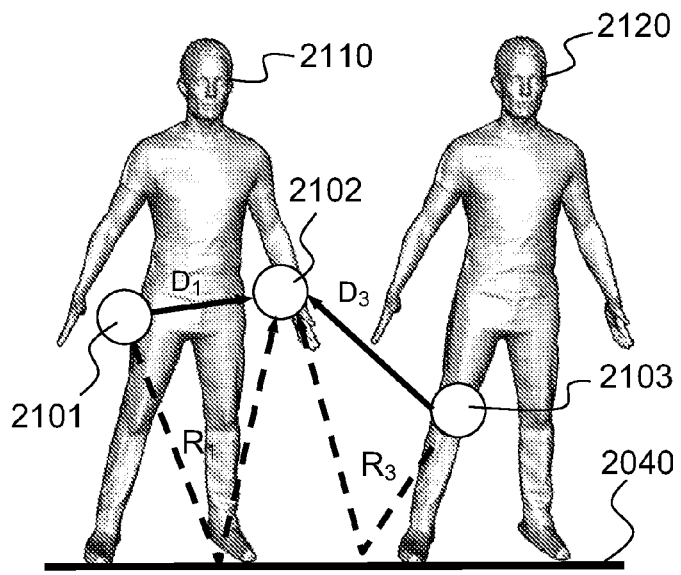
Figure 20B:
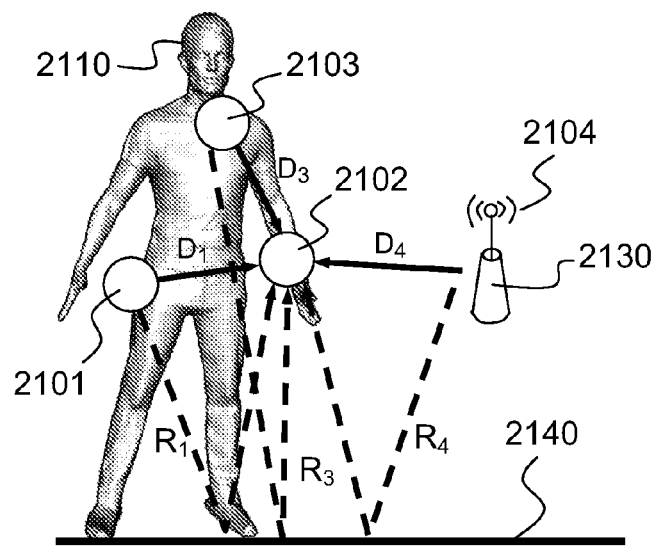

BANs situated on distinct mobile bodies;

FIGS. 4b, 4c, examples of use of cooperative linkups between several BANs situated on distinct mobile bodies ("1-to-N" inter-BAN cooperation FIG. 4b and "N-to-N" inter-BAN cooperation FIG. 4c);

FIGS. 4-1, 4-2, 4-3, 4-4, 4-5, 4-6, 4-7, 4-8 diagrams illustrating several possible configurations of the device according to the invention, FIG. 5, a first embodiment of a device according to the invention;

FIG. 6, a second embodiment of a device according to the invention;

FIG. 7, a third embodiment of a device according to the invention;

FIGS. 8a and 8b, the disposition/configuration (8a) and the steps (8b) of a first exemplary method according to the invention;

FIGS. 9a and 9b, the disposition/configuration (9a) and the steps (9b) of a second exemplary method according to the invention;

FIGS. 10a, and 10b, the disposition/configuration (10a) and the steps (10b) of a third exemplary method according to the invention;

FIG. 11, the disposition/configuration of a fourth exemplary method according to the invention;

FIGS. 12a and 12b, curves illustrating the improvement in the accuracy of locating the nodes of a BAN obtained by a device according to the invention using intra-BAN cooperative linkups;

FIG. 12c, curves illustrating the improvement in the success rate in locating the nodes of a BAN by virtue of a device according to the invention using intra-BAN cooperative linkups;

FIG. 12d, curves illustrating the reduction in the time required to determine the position of the nodes of a BAN by virtue of a device according to the invention using a selection of the cooperative linkups within a BAN;

FIGS. 13a and 13b, curves illustrating the improvement in the rate of locating the nodes of a BAN obtained by a device according to the invention using cooperative linkups in one or more close BANs;

FIGS. 13c and 13d, a graphic illustrating the improvement in the success rate in locating the nodes of a BAN by virtue of a device according to the invention using cooperative linkups in one or more close BANs FIG. 14, a schematic illustrating two phases of an implementation of a method according to the invention utilizing at least one measurement of indirect path time;

FIG. 15, an embodiment of an ultra wideband receiver implemented by a method according to the invention utilizing at least one measurement of indirect path time, - FIG. 16, an exemplary indirect path caused by a ground reflection, FIGS. 17a and 17b, illustrating a first implementation of a method according to the invention utilizing at least one measurement of indirect path time, FIGS. 18a and 18b, illustrating a second implementation of a method according to the invention utilizing at least one measurement of indirect path time, FIG. 19, illustrating a third implementation of a method according to the invention utilizing at least one measurement of indirect path time, FIGS. 20a and 20b, illustrating a fourth implementation of a method according to the invention utilizing at least one measurement of indirect path time.

DETAILED DESCRIPTION

Hereinafter, the expression "cooperative BAN location" designates a type of location implementing measurements of distance between mobile objects situated on one and the same person and other objects situated on this same person, or on a group of people or at the level of the infrastructure.

The expression "absolute position" designates a node's position calculated in a given reference datum, for example, a position of GPS type or a position calculated with respect to an infrastructure (comprising anchors whose positions are known a priori).

The expression "relative position" designates a node's position defined with respect to other entities, potentially mobile (BANs, objects, etc), or elements of the environment (storey, room, for example), without reference to an absolute reference datum.

The expressions "BAN geographically close to" or "BAN remote from" a first BAN are understood to mean a BAN which is within communication range of the first BAN.

Figure 1A:
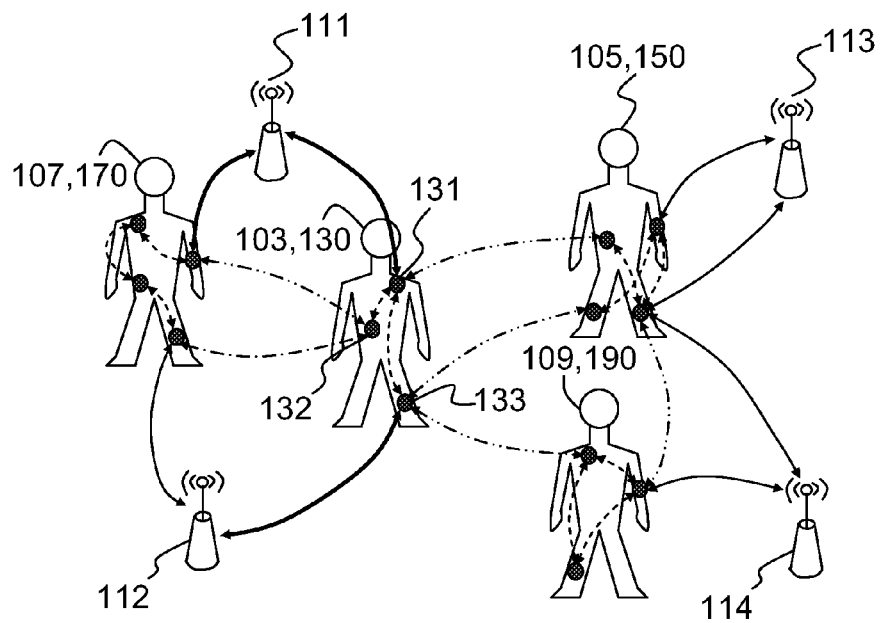
FIG. 1a, an exemplary device according to the invention in a context of use.

An exemplary device according to the invention is now described in a particular and nonlimiting context and in conjunction with Figure 1a. A mobile human body 103 comprises several communication nodes 131, 132, 133 forming a body network 130, which body network is also designated by the name BAN 130, for "Body Area Networks". Each of these nodes 131, 132, 133 is a wireless object, which may be a transmitter, a receiver or else both jointly. This wireless object may be fixed inside the mobile body, for example in the form of implants, or on its surface for example in direct contact with the limbs of a person or integrated into his clothing, so that the nodes of one and the same BAN can be mobile with respect to one another and that there exist bio-mechanical order relations (for example, a node is disposed on a hand which is necessarily linked to a human body by way of an arm limiting the extent of its movements) or mechanical order relations governing the mobility of these nodes, these relations optionally being mobilizable within the framework of the invention. The device according to the invention makes it possible to accurately determine the position of one or more nodes of the BAN 130 with increased coverage, notably by virtue of the joint implementation of cooperative methods of location:

between nodes of the same BAN 130; this type of cooperative method will be referred to hereinafter as "intra-BAN" cooperative method; and between nodes belonging to BANs situated within communication range, in the example between at least one node included in the BAN 130 and at least one node included in the geographically close BANs 150, 170, 190; this type of cooperative method will be referred to hereinafter as "inter-BAN" cooperative method.

The positions of nodes of the BAN 130 are thus determined:

in relation to the nodes of the same BAN 130 which optionally have positions that are already known or that it has been possible to determine; and in relation to the nodes of the surrounding BANs 150, 170, 190.

Even if the nodes of the surrounding BANs 150, 170, 190 or the other nodes of the same BAN 130 that served for the intra-BAN or inter-BAN measurements are not positioned in an absolute manner, the carrying out and the combining of several measurements of distances makes it possible, for example, to afford indications about the relative position (or distance) of a node with respect to other surrounding nodes.

The determination of relative positions may suffice for certain applications such as motion capture or the optimization of the transmissions with information relay in the network(s), for example. However, to obtain absolute positions, that is to say positions that can be placed in a known geographical reference datum—for example, the WGS84 geodesic reference datum—, the device according to the invention can also implement cooperations between nodes 131, 132, 133 of the BAN 130 and anchors 111, 112, 113, 114, which are surrounding base stations whose geographical positions are known.

The method according to the invention applies equally well to partial location of the nodes of a BAN and to complete location. The expression "partial location" designates situations in which the method according to the invention makes it possible to determine the absolute position of a first node of a BAN and the relative positions (or distances) of the other nodes of the BAN with respect to this first node, without being able nonetheless to ascertain the absolute position of these other nodes.

The example of FIG. 1a shows a BAN 103 comprising three nodes 131, 132, 133. The first node 131 is situated at the top of the body 103, for example on a shoulder, and is within communication range—for example, a few tens of meters in the case of an ultra wideband radio network—of a first anchor 111 and of a second mobile body 105. The second node 132 is situated in the middle of the body 103, for example on the hip, and is within communication range of a third mobile body 107. The third node 133 is situated at the bottom of the body 103, for example on a leg, and is within communication range of a second anchor 112, of the second mobile body 105 and of a fourth mobile body 109. The second, third and fourth mobile bodies 105, 107, 109 each comprise a BAN 150, 170, 190 which can also implement the method according to the invention to determine the positions of its nodes. Stated otherwise, several devices according to the invention can cooperate together, nodes in each BAN 130, 150, 170, 190 being able to interact with other nodes of the same BAN or nodes of close BANs.

The method and the device according to the invention can be configured to have a low impact on the performance of the medium access layer, or MAC ("Medium Access Control") layer, by virtue of the use of selective measurements.

Figure 1B:
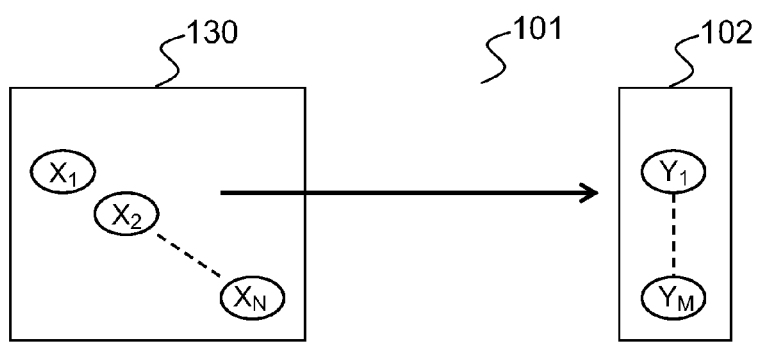
FIG. 1b, a diagram presenting the architecture of a device according to the invention.

FIG. 1b shows diagrammatically the architecture of a device according to the invention. The device 101 comprises a first BAN 130 provided with N communication nodes $X_1$, $X_2, \ldots, X_N$, N being greater than or equal to two. The device 101 is situated within communication range of at least one remote apparatus 102 provided with M communication nodes $Y_1, Y_2, \ldots, Y_M$, M being greater than or equal to 1, this remote apparatus 102 being able, for example, to be a fixed anchor, another device according to the invention comprising its own BAN, or a mobile body provided with a single communication node.

The device of FIG. 1b operates in two phases relying on a concomitant utilization of at least two types of distance measurements from among measurements between anchors and a BAN, intra-BAN measurements, and inter-BAN measurements. In a first phase, several nodes $X_1, X_2, \ldots, X_N$ of the first BAN 130 perform at least one measurement of distance between this node and a second node, belonging either to the first BAN 130, or to the apparatus 102, in such a way that among all the measurements of distances performed, at least one measurement is performed with a second node $Y_1$, $Y_2, \ldots, Y_M$ belonging to the remote apparatus 102. Once these measurements of distances have been performed, the latter are utilized in a second phase by the device to locate communication nodes $X_1, X_2, \ldots, X_N$ of the first BAN 130, and optionally to deduce therefrom the position of the first BAN 130, in relation to the apparatus 102.

Figure 2:
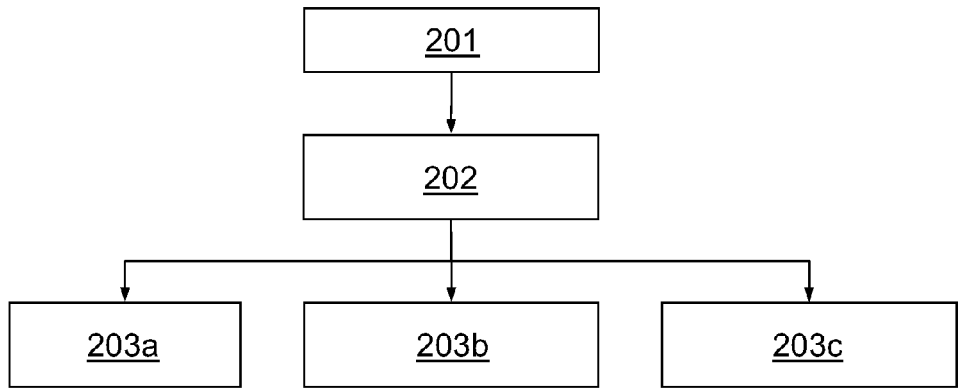
FIG. 2, a schematic presenting the steps of a method according to the invention.

FIG. 2 illustrates, by a schematic, the steps of a method according to the invention. The method according to the invention comprises two main phases 201, 202. The first phase 201 is a phase of measuring distances and the second phase 202 is a phase of utilizing these measurements, with a view to providing information required by one or more applications 203a, 203b, 203c, the positioning of the mobile body and optionally its tracking over time, the capture of motions or postures, and the auto-organization of a body network, stated otherwise aid to assist the automatic deployment of a body network so as to avoid having to configure it manually.

The first phase 201 involves measurements of distances between nodes of one and the same BAN, between nodes of different BANs and optionally between at least one node of a BAN and one or more anchors. A measurement of distance between two nodes can be performed by an exchange of signals between these nodes or at least one transmission of a signal between two nodes, it being possible to use various metrics to estimate the distance separating the nodes.

The estimation of a distance between two wireless apparatuses is generally based on the calculation of a time of flight (also designated by the acronym TOF) and on the knowledge of the speed of the waves in air (for example electromagnetic waves in the case of radio transmissions or acoustic waves). The time of flight describes the time taken by a wave to cross a distance separating a transmitter from a receiver. Advantageously, the employment of a radio technology of Ultra Wide Band type allows very accurate measurement of the TOF, on account of the signals resolution properties and the channel fine synchronization or temporal representation capabilities.

The following temporal radio metrics may notably be used to undertake the positioning:
- the time of arrival (or TOA) metric, in which the value of the TOF is determined by virtue of measurements of TOA subsequent to an exchange of several signals (or packets) between devices (nodes) which are a priori asynchronous, these techniques being known by the terms "two-way ranging", "three-way ranging" or else "double sided two-way ranging";
- the time of arrival (or TOA) metric, in which the value of the TOF is determined by virtue of a measurement of the TOA subsequent to the transmission of a signal between a pair of synchronized devices, this technique being known by the term "one-way ranging", the synchronization between the two radio devices being performed by means of a procedure known to the person skilled in the art, for example with a clock and/or one or more remote triggers linked physically to the two radio devices by means of cables or additional radio linkups and communicating a synchronization "pip" to the two radio devices by these same means, and/or by the presence of a GPS receiver on board each of the two radio devices, etc.; and
- the time difference of arrival (or TDOA) metric, the TDOA being obtained by virtue of a measurement of the differences in time of arrival (TOA) in accordance with the technique of "one-way ranging" with receivers considered to be isochronous (that is to say sharing the same time base), independently of the actual instant of transmission.

Hence, a measurement of distance between two apparatuses can also be obtained by using a metric of such type as the power of the signal received (or RSSI for "Received Signal Strength Indicator"). However, estimation of a distance on the basis of the power of the signal received is not trivial, particularly when it is applied to wireless body networks, given the great variability of the radio transmission channel, due mainly to the masking effects and to the phenomena of fast fading. Moreover, the use of the RSSI metric would require the knowledge:
- on the one hand, of a model establishing a relation between the attenuation (sometimes referred to by the expression "path loss") undergone by the power transmitted as a function of the distance traversed by the radio wave between the transmitter and the receiver (for example, a model of mean attenuation for so-called "free space" propagation), and
- on the other hand, of sufficiently accurate parameters for this same model (for example, a decay factor (or "path loss exponent"), the standard deviation of the fluctuations related to the phenomena of masking (or "Shadowing") and/or fast fading (or "Small-Scale Fading"), the attenuation undergone or power received at the reference distance, or indeed the transmission power, the gains of the transmission and reception antennas. The majority of these parameters depends mainly on the propagation environment, notably whether the distance measurement is performed indoors or outdoors, with static or mobile objects, with obstructions of the radio linkups or not. Consequently, the first two metrics TOA and TDOA are favored within the framework of the present invention.

The second phase 202 of the method according to the invention is a phase of utilizing the measurements of distances obtained during the first phase 201, according to the various abovementioned cooperative methods (intra-BAN, inter-BAN, anchor-BAN), so as to determine the relative or absolute positions of one or more nodes of a BAN or of several BANs.

The algorithm used to determine the positions on the basis of the distance measurements is, for example, a known algorithm, such as a non-linear optimization method, the linearized least squares matrix procedure, multilateration and trilateration procedures, Kalman filters and particle filters (including cooperative ones). This algorithm takes as input the various distance measurements available and/or selected, and returns as output the various information required such as the relative positions (for example the relative distances between all the mobile nodes of one and the same BAN), absolute positions, for a given application, for example for navigation, location of a BAN, capture of motions.

Figure 3A:
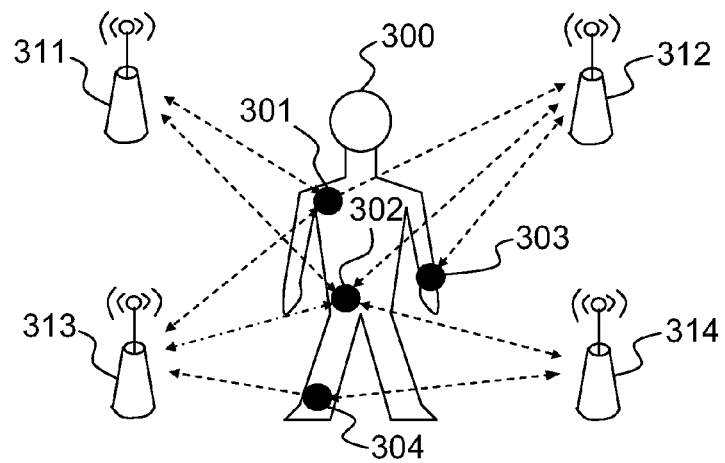
FIG. 3a, an exemplary body network (BAN) according to the prior art.

FIG. 3a presents an exemplary BAN according to the prior art to illustrate problems encountered in the known BANs. Measurements of distances are performed between wireless nodes 301, 302, 303, 304 of a BAN situated on the body 300 of a person and four anchors 311, 312, 313, 314 located in the surrounding space. The measurements of distances being obtained via signals exchanged between the wireless nodes, the phenomena of fast fading and of mask effects induced by the human body in motion may disturb these exchanges of signals and therefore the measurements. Furthermore, depending on the orientation of the body 300 of the person with respect to the anchors 311, 312, 313, 314, the measurements of distances obtained may be incomplete, because, for example:
- of the dynamic character of the topology of the network, which induces temporary disappearances of certain radio linkups;
- the presence of a very high packet error rate (PER) (the PER representing the probability of loss of data packets transmitted subsequent to demodulation errors and/or synchronization errors), translating losses of packets useful for location (measurements of distances and/or transmissions of information such as the measured or estimated quantities, in the form of clock "timers", of distances or of coordinates);
- of a strong attenuation of the signals passing through the human body;
- of a low transmission power rendering one or more nodes out of range of the anchors 311, 312, 313, 314.

Generally, four distance measurements per node are required in order to perform a non-cooperative positioning in 3D of a node (by using for example a trilateration technique), and three measurements are required in order to perform a positioning in 2D. Hence, as illustrated in FIG. 3a, only the positioning of two nodes 301, 302 is possible by virtue of the use of a trilateration algorithm. The position in 2D of the first node 301 can be determined by virtue of measurements of distances performed between this first node 301 and three anchors 311, 312, 313, while the position in 3D of the second node 302 can be obtained by virtue of measurements of distances performed between this second node 302 and four anchors 311, 312, 313, 314. It is not possible to determine the absolute position of the other two nodes 303, 304 in the reference datum of the anchors, given the overly low number of measurements obtained, fewer than three. By way of illustration, the impossibility of determining the position of two nodes 303, 304 out of the four present 301, 302, 303, 304 on the body 300 affects the estimation of the BAN's position, when the latter is, for example, performed by calculating the barycenter of the coordinates of the nodes whose positions it has been possible to determine solely on the basis of linkups in relation to the anchors.

A first technique for alleviating the aforementioned drawbacks of the BAN of FIG. 3a is a cooperative method of intra-BAN type coupled with the linkups already present in relation to the anchors. This cooperative method implements measurements of Intra-BAN distances, that is to say measurements of distance between nodes belonging to one and the same BAN.

Moreover, in order to limit the impact on the performance of the MAC layer (notably in terms of bitrate, energy, latency), the radio linkups between the nodes are not taken into account in an exhaustive manner. Indeed, only a subset of radio linkups is taken into account during the first phase 201 (cf. FIG. 2) of measuring distances. A satisfactory criterion for selecting radio linkups forming part of this subset is to choose solely the linkups between the nodes whose position it has not been possible to determine and the nodes whose position it has been possible to determine. Thus, the nodes whose positions have already been determined—by virtue of the measurements of distance with the anchors—are, subsequently, considered to be "virtual anchors", that is to say objects that can, in their turn, be used as reference frames, in the same way as the anchors already present in the form of apparatuses remote from the BAN. It will thus be possible for these virtual anchors to be used by certain nodes belonging to the same BAN in order to be able to determine their position. Another solution in accordance with the method according to the invention consists in using strictly the same measurements as in the previous cooperative case, but in ensuring the positioning of all the mobile nodes simultaneously, by feeding a single algorithmic step of positioning or tracking with the measurements available and/or selected, without resorting to the intermediate calculation of the positions of virtual anchors.

Figure 3B:
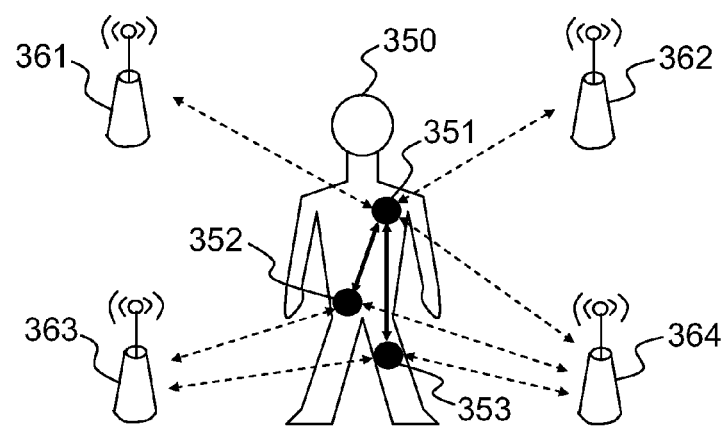
FIG. 3b, an illustration of the employment of virtual anchors within a BAN of the device according to the invention.

FIG. 3b illustrates the employment of virtual anchors within a BAN of the device according to the invention, stated otherwise a cooperative method of intra-BAN type. A BAN 350 comprises three nodes 351, 352, 353 and is surrounded by four anchors 361, 362, 363, 364. It has been possible to determine the distances separating the first node 351 from the first anchor 361, from the second anchor 362 and from the fourth anchor 364, thereby enabling this first node 351 to be located. On the other hand, the second and third nodes 352, 353 cannot be located solely with the linkups in relation to the anchors since it has been possible to determine solely the distances separating them respectively from the third and fourth anchors 363, 364.

Hence, in order to determine the position of the second and third nodes 352, 353, measurements, represented by arrowed solid lines in FIG. 3b, of distance to the first node 351 are performed. Indeed, once the position of the first node 351 has been determined, this first node 351 is considered to be an additional anchor by the other nodes 352, 353. By combining the measurements of distances already obtained with the anchors 363, 364, as well as the additional measurements of distance to the "virtual" anchor consisting of the first node 351, a sufficient number of measurements is available to be able to estimate a position of the second and third nodes 352, 353. Even though the number of available measurements would be insufficient to be able to estimate a position of the second and third nodes 352, 353, the additional measurements of distances obtained would make it possible to restrict the geographical zone, in space, in which these nodes 352, 353 are liable to be situated.

Advantageously, recourse to one or more "virtual" anchors is required only for the nodes whose positions it has not been possible to determine by virtue of the measurements of distances with the anchors 361, 362, 363, 364 consisting of apparatuses close to the BAN 350. The method therefore then involves selective measurements of distance between the nodes of one and the same BAN. This method of intra-BAN cooperation utilizes the spatial diversity of the wireless nodes to maximize the coverage and the accuracy of location of a BAN, while avoiding resorting to exhaustive measurements of distances between each pair of nodes, therefore with a low impact on the performance of the medium access protocol (MAC).

A second technique for alleviating the aforementioned drawbacks of the BAN of FIG. 3a is a cooperative method of inter-BAN type, implementing measurements of distance between nodes belonging to different BANs. In the prior art, the proposed solutions generally make do with performing measurements of distances between a very specific pair of nodes. In these conventional cases, the BAN is either considered to be formed of a single wireless node, or else only one of the nodes forming the BAN (sometimes called, the "cluster head") is authorized (or able) to perform distance measurements.

FIG. 4a presents a simple cooperation of "1-to-1" type, which is similar to solutions already employed in the prior art. Two BANs 401, 402 move around in proximity to one another. One of the nodes, in each BAN 401, 402, is chosen to be a leader node 405, 406 (or "cluster head"), and the distance measurements are performed only between the leader nodes 405, 406 within communication range. This method of cooperation is limited since it does not make it possible to take spatial diversity and information redundancy into account, these being made possible by the presence of several nodes on the bodies.

The first phase 201 of the method according to the invention is suitable for the implementation of a cooperative scheme between BANs with measurements of distances between several nodes of these BANs, and not with a simple relation between a first node of a first BAN and a second node of a second BAN. According to the method according to the invention, each node of a first BAN can carry out measurements of distance to:

other nodes situated on BANs which are geographically close, stated otherwise, which are within communication range of the first BAN;

nodes belonging to the surrounding infrastructure, that is to say to anchors or nodes of a fixed network of sensors.

FIGS. 4b, 4c illustrate the use of cooperative linkups between several BANs situated on distinct mobile bodies. FIG. 4b presents a cooperation of "1-to-n" type. In each BAN 411, 412, one of the nodes 415 will be able to perform measurements of distance to all the other nodes 416, 417, 418 included in geographically close BANs. FIG. 4c presents a cooperation of "n-to-n" type. All the nodes 423, 424, 425 of one and the same BAN 421 are able to perform measurements of distances to the nodes 426, 427, 428 included in geographically close BANs 422.

Thus, one or more nodes of a close BAN can be used to perform complementary distance measurements. By virtue of the inter-BAN cooperation, people who would be outside of the range of the anchors or base stations can utilize these measurements of distances to other BANs in geographical proximity so as to be able to locate themselves. These BANs, or the nodes forming these BANs, can for example play the role of virtual anchors, thus making it possible to increase location coverage. It should be noted that it is not necessary for a node to become a virtual anchor (that is to say a node whose position has been determined) in order to be able to be used to perform complementary distance measurements.

FIGS. 4-1, 4-2, 4-3, 4-4, 4-5 present diagrams illustrating several possible configurations of the device according to the invention. Mobile bodies each comprising nodes that can form a BAN are represented by ovoids, anchors are represented by squares, the crosses representing nodes, and the straight lines represent communication linkups aimed at measuring a distance.

In FIG. 4-1, a first mobile body 441 comprises two nodes 441a, 441b, the first node 441a performing a measurement of distance with an anchor 443, the second node 441b performing a measurement of distance with a node 442a of a second mobile body 442 moving around in proximity to the first mobile body 441.

In FIG. 4-2, a mobile body 451 comprises two nodes 451a, 451b, the first node 451a performing a measurement of distance with an anchor 453, the second node 451b performing a measurement of distance with the first node 451a of the mobile body 451.

In FIG. 4-3, a first mobile body 461 comprises two nodes 461a, 461b, the first node 461a performing a measurement of distance with a node 462a of a second mobile body 462 remote from the first mobile body 461, the second node 461b of the first mobile body 461 performing a measurement of distance with the first node 461a of the same mobile body 461.

In FIG. 4-4, a first mobile body 471 comprises two nodes 471a, 471b, the first node 471a performing a measurement of distance with a first node 472a of a second mobile body 472 remote from the first mobile body 471, the second node 471b of the first mobile body 471 performing a measurement of distance with the second node 472b of the second mobile body 472.

In FIG. 4-5, a first mobile body 481 comprises two nodes 481a, 481b, the first node 481a performing a measurement of distance with a node 482a of a second mobile body 482 remote from the first mobile body 481, the second node 481b of the first mobile body 481 performing a measurement of distance with a node 484a of a third mobile body 484 moving around remotely from the first two mobile bodies 481, 482.

In FIG. 4-6, a first mobile body 491 comprises two nodes 491a, 491b, the first node 491a performing a measurement of distance with a first node 492a of a second mobile body 492 remote from the first mobile body 491 and another measurement of distance with a second node 492b of the second mobile body 492.

In FIG. 4-7, a first mobile body 491 comprises two nodes 491a, 491b, the first node 491a and the second node 491b each performing a measurement of distance with a first node 492a of a second mobile body 492 remote from the first mobile body 491 and another measurement of distance with a second node 492b of the second mobile body 492.

In FIG. 4-8, a first mobile body 491 comprises two nodes 491a, 491b, the first node 491a and the second node 491b each performing a measurement of distance with a first node 492a of a second mobile body 492 remote from the first mobile body 491 and another measurement of distance with a second node 492b of the second mobile body 492, the first node 491a and the second node 491b each performing a measurement of distance with a first node 493a of a third mobile body 493 remote from the first mobile body 491 and another measurement of distance with a second node 493b of the third mobile body 493.

In each of the aforementioned cases, the combination of the measurements of distances effected with nodes belonging to different elements makes it possible to improve the coverage and the accuracy of location of the nodes possessed by the first mobile body 441, 451, 461, 471, 481, 491.

Several nonlimiting embodiments of the device according to the invention are now presented. Depending on the mode chosen, the nodes can either be transmitters, receivers, or else both at one and the same time and the distance metric can be different, for example TOA, TDOA, or RSSI. Moreover, the calculation of the positions performed during the second phase 202 (cf. FIG. 2) of the method according to the invention, on the basis of the measurements of distances obtained during the first phase 201, can either be centralized, that is to say performed by a single calculation unit (for example in a node of a BAN), or decentralized, stated otherwise performed by several distributed calculation units (for example, calculation units distributed among several nodes of a BAN).

FIG. 5 presents a first embodiment of a device according to the invention. The device according to the invention comprises a mobile BAN 501 formed of nodes which are transmitters, represented by letters "E" in the figure. Within communication range of the mobile BAN 501 are anchors 511, 512, 513, 514 and another mobile apparatus 502, each comprising communication nodes in the form of receivers, represented by "R" in the figure, or of transmitters/receivers, represented by "E/R" in the figure, the expression "transmitters/receivers" designating a node that can transmit and receive signals. These nodes suitable for reception make it possible to ensure a radiofrequency link with the mobile BAN 501 and, ultimately, allow the transmitter nodes of this mobile BAN 501 to be located. The arrowed dashes represent the signals transmitted by the transmitters.

Several location metrics can be used for the embodiment of FIG. 5. A first conceivable metric is the TDOA procedure which requires a synchronization of the "receiver" and/or "transmitter/receiver" nodes. A second metric is that of the TOA, which can be implemented if the transmitters, on the one hand, and the receivers and/or transmitters/receivers, on the other hand, are synchronized by an exterior means (for example by GPS or wire-based link). A third applicable metric is related to the radio power received, for example the RSSI metric which does not require any synchronization of the devices present at the level of the environment for location purposes (except a coarser synchronization in order to communicate between a transmitter and a receiver or a transmitter/receiver). In this example, the calculation of the positions of the nodes of the mobile BAN 501 is performed, preferably, in a centralized manner and at the level of the infrastructure, that is to say for example at the level of the anchors 511, 512, 513, 514.

FIG. 6 presents a second embodiment of a device according to the invention. The device according to the invention comprises a mobile BAN 601 formed of nodes which are receivers, represented by letters "R" in the figure. Within communication range of the mobile BAN 601 are anchors 611, 612, 613, 614 and another mobile apparatus 602, each comprising communication nodes in the form of transmitters, represented by "E" in the figure, or of transmitters/receivers, represented by "E/R" in the figure. These nodes suitable for transmission make it possible to ensure a radiofrequency link with the mobile BAN 601 and, ultimately, allow the receiver nodes of this mobile BAN 601 to be located. The arrowed dashes represent the signals transmitted by the transmitters.

Two main location metrics can be used for the embodiment of FIG. 6. A first conceivable metric is of temporal type, for example the TOA metric or the TDOA metric which requires a synchronization of the "transmitter" and/or "transmitter/receiver" nodes. A second metric is related to the radio power received, for example the RSSI metric, and does not require any synchronization of the devices present at the level of the environment for location purposes (except a coarser synchronization in order to communicate between a transmitter and a receiver or a transmitter/receiver). In this example, the calculation of the positions of the nodes of the BAN 601 can be performed by a calculation module (not represented in the figure) embedded at the level of the mobile BAN 601,—in a manner centralized at the level of a node or by calculation distributed over several nodes of the BAN 601—. The calculation of the positions of the nodes of the BAN 601 can also be performed at the level of the infrastructure if the distance measurements performed at the level of the receiver nodes of the mobile BAN 601 are communicated to the infrastructure via other wireless communication means, for example.

FIG. 7 presents a third embodiment of a device according to the invention. The device according to the invention comprises a mobile BAN 701 formed of nodes which are transmitters/receivers, represented by letters "E/R" in the figure. Within communication range of the mobile BAN 701 are anchors 711, 712, 713, 714 and another mobile apparatus 702, each comprising communication nodes in the form of transmitters/receivers, represented by "E/R" in the figure. The TOA, TDOA and RSSI metrics can be used for this embodiment and the calculation of the positions of the nodes of the BAN 701 can be performed equally well at the level of the mobile BAN 701,—in a manner centralized at the level of a node or by calculation distributed over several nodes of the BAN 701—and at the level of the infrastructure.

Moreover, the examples presented in FIGS. 5, 6, and 7 can be combined so that a BAN comprises, for example, transmitter nodes and receiver nodes. The configuration of the BAN is chosen notably as a function of the application aimed at and the constraints relating thereto, for example the consumption and the synchronization of the nodes.

Yet other aspects of the implementation of the method according to the invention can form the subject of variations, depending on the application aimed at. Several other nonlimiting examples of implementation are presented in the following figures, so as to show possible adaptations in terms of cooperative schemes used as well as the order in which they are employed.

FIGS. 8a and 8b present the configuration of networks and the steps of a first exemplary method according to the invention which utilizes a cooperation of intra-BAN type, in addition to a positioning with respect to an infrastructure, to determine the absolute position of nodes of a BAN 801 in a context where the energy consumption constraint is important. Since the distance measurements are obtained by virtue of transmissions of signals between the nodes, it is appropriate, in order to reduce the energy consumption, to minimize the number of these transmissions. Hence, the order in which the measurements of distances are carried out is important.

In the example of FIGS. 8a and 8b, measurements of distances are, in a first step 811, performed between anchors 805, 806, 807, 808 and nodes of the BAN, so as to position these nodes with respect to the infrastructure. On completion of this first step, it is possible that only certain nodes 821, 822 of the BAN 801 are positioned, it not having been possible to determine the positions of the other nodes 823, 824, notably on account of the losses undergone at the level of the radio channel, notably by collisions and interference, or because of too unfavorable a signal-to-noise ratio.

In a second step 812, executed only if it has not been possible to position certain nodes of the BAN on completion of the first step characterized by the configuration 811, measurements of distances are carried out in a selective and not exhaustive manner. More precisely, measurements of intra-BAN distances, represented by dashed lines in FIG. 8a, are carried out between first nodes 823, 824 whose position it has not been possible to determine during the first step 811 and second nodes 821, 822 whose position has already been determined via measurements of distances with the anchors. Certain cooperative linkups are deliberately sacrificed with a view to limiting the exchanges of signals and thus reducing energy consumption.

In an optional third step, the global position of the BAN is estimated, for example by calculating the barycenter of the coordinates of the nodes whose position has been estimated.

FIG. 8b more precisely illustrates the flow of the method of location, according to this first example.

Initially 851, measurements of distance are performed between the nodes of the BAN 801 (cf. FIG. 8a) and the surrounding anchors 805, 806, 807, 808. A distance measurement comprises, for example, a first step 851a of transmitting or of exchanging radiofrequency signals between the nodes of the BAN 801 and the anchors and a second step 851b of evaluating the distance on the basis of the signals transmitted or exchanged by using a radiolocation metric from among those mentioned above. Once these distance measurements have been performed, a step 852 of estimating the position of the nodes of the BAN 801 is executed by combining these distance measurements. On completion of this estimating step 852, a test 853 is executed to ascertain whether it has been possible to position all the nodes of the BAN. If all the nodes of the BAN 801 have been positioned, then a step 860 of estimating the global position of the BAN 801 can be executed by combining the previously estimated positions of the nodes. If, on the contrary, it has not been possible to position certain nodes of the BAN 801, then intra-BAN measurements are performed 854 within the BAN 801. Thereafter, a complementary step 855 of estimating the position of the nodes which had not been positioned during the previous step 852 of estimating the position of the nodes is executed. On completion of this complementary estimating step 855, the step 860 of estimating the global position of the BAN 801 can be executed, this benefiting from the node positions determined during the complementary estimating step 855 so as, notably, to obtain a more accurate global estimation of the position of the BAN 801.

FIGS. 9a and 9b present the network(s) configuration and the steps of a second exemplary method according to the invention which jointly utilizes a cooperation of intra-BAN type and of inter-BAN type, in addition to a positioning with respect to an infrastructure, to determine the absolute position of the nodes of a BAN 901 in a context where the energy consumption constraint is important. Similarly to the first example of FIGS. 8*a*, 8*b*, the order in which the measurements of distances are carried out is important for limiting the energy consumption.

A first step 911 is identical to the first step 811 of FIG. 8*a*. Measurements of distances are carried out between the nodes 921, 922, 923, 924 of the BAN 901 and the surrounding anchors 905, 906, 907, 908, so as to determine the position of several nodes in relation to the infrastructure consisting of these anchors 905, 906, 907, 908.

In a second step 912, two types of distance measurements are performed concomitantly. The first type of measurements is represented by dashed lines in FIG. 9*a*; this entails the measurements between nodes of the BAN 901, in a manner similar to the intra-BAN cooperation illustrated in FIG. 8*a*. The second type of measurements is represented by solid lines between the first BAN 901 and a second BAN 902; this entails measurements of distances of inter-BAN type, between the nodes 923, 924 of the first BAN 901 whose position it has not been possible to determine during the first step 901 and nodes 931, 932, 933 of another BAN 902 within communication range of the first BAN 901. These intra-BAN and inter-BAN cooperations are combined to maximize the number of positioned nodes of the BAN 901 and to refine the estimation of the position of the nodes of the BAN 901.

FIG. 9*b* more precisely illustrates the flow of the method of location, according to this second example.

Initially 951, measurements of distance are performed between the nodes of the first BAN 901 (cf. FIG. 9*a*) and the surrounding anchors 905, 906, 907, 908. A distance measurement comprises, for example, a first step 951*a* of transmitting radiofrequency signals between the nodes of the first BAN 901 and the anchors and a second step 951*b* of evaluating the distance by using a metric from among those mentioned above. Once these distance measurements have been performed, a step 952 of estimating the position of the nodes of the BAN 901 is executed by combining these distance measurements. On completion of this estimation step 952, a test 953 is executed to ascertain whether it has been possible to position all the nodes of the BAN. If all the nodes of the first BAN 901 have been positioned, then a step 960 of estimating the global position of the first BAN 901 can be executed by combining the previously estimated positions of the nodes. If, on the contrary, it has not been possible to position certain nodes of the first BAN 901, then intra-BAN measurements are performed 954 within the BAN 901. In parallel, inter-BAN measurements 954' are performed between the first BAN 901 and the second BAN 902. Thereafter, a complementary step 955 of estimating the position of the nodes which had not been positioned during the previous step 952 of estimating the position of the nodes is executed. On completion of this complementary estimating step 955, the step 960 of estimating the global position of the BAN 801 can be executed, this benefiting from the node positions determined during the complementary estimating step 955 so as, notably, to obtain a more accurate global estimation of the position of the first BAN 901.

FIGS. 10*a* and 10*b* present network(s) configuration and the steps of a third exemplary method according to the invention, which jointly utilizes a cooperation of intra-BAN type and of inter-BAN type, in addition to a positioning with respect to an infrastructure, to determine the absolute position of the nodes of a BAN 1001 in a context where the accuracy constraint is important. All the distance measurements being able to be carried out are then taken into account.

Hence, concomitantly, measurements of distance are performed, in an exhaustive manner and in the limit of achievable transmission linkups (i.e. under conditions of restricted connectivity), between each node of the BAN 1001 and:

all the anchors 1005, 1006, 1007, 1008 within communication range;

all the other nodes of the BAN 1001 (intra-BAN cooperation); these measurements of distances are represented by dashed lines in FIG. 10*a*;

all the nodes included in BANs 1002, 1003 within communication range (inter-BAN cooperation).

For this implementation of the method according to the invention, the order in which the measurements are carried out is not important, since all the measurements are utilized simultaneously to estimate the position of the nodes. In this example, all the cooperative linkups (intra-BAN, inter-BAN and anchors 1005, 1006, 1007, 1008) are considered jointly with a view to improving the accuracy of location, to the detriment of the energy consumption.

FIG. 10*b* more precisely illustrates the flow of the method of location, according to this third example.

Initially 1011, the steps 1051, 1052, 1053 of distance measurements are performed in parallel or sequentially, but in an exhaustive manner. A step 1051 relates to the measurements between the BAN 1001 and the anchors 1005, 1006, 1007, 1008, another step performed 1052 relates to the intra-BAN measurements, and yet another step performed relates to the inter-BAN measurements between the BAN 1001 and the other BANs 1002, 1003. On completion of these steps of distance measurements 1051, 1052, 1053, a step 1055 of estimating the position of the nodes of the BAN 1001 is executed, and then an optional step 1060 of estimating the global position of the BAN 1001 is executed.

FIG. 11 illustrates a multiple use of the method according to the third example presented in FIGS. 10*a*, 10*b*. The method jointly utilizes a cooperation of intra-BAN type and of inter-BAN type, in addition to a positioning with respect to an infrastructure, to concomitantly determine the absolute position of the nodes of several BANs 1101, 1102, 1103 in a context where the accuracy constraint is very important.

The steps of the third example described above are executed by each of the BANs 1101, 1102, 1103, the exhaustive measurements being utilized simultaneously by each BAN to estimate the position of their nodes.

Thus, depending on whether one is seeking high accuracy or low energy consumption and low latency, depending on whether an absolute or relative positioning is desired, the exhaustive or selective character of the measurements of distances to be performed, the types of cooperative schemes to be combined (intra-BAN and inter-BAN; anchors-BAN and intra-BAN; anchors-BAN and inter-BAN; anchors-BAN and intra-BAN and inter-BAN), as well as the order in which these schemes are implemented, are chosen differently.

To summarize, it is possible to identify notably the following modes of implementation:

if low energy consumption is sought, it is preferable to choose a selective mode of distance measurements, and:
if absolute positioning is desired, choose a cooperative scheme firstly involving measurements of distances with anchors;
if relative positioning is desired, choose a combination of intra-BAN and inter-BAN schemes;
if high accuracy is desired, choose an exhaustive mode of distance measurements, and:

if absolute positioning is desired, involve all the cooperative schemes available (anchors-BAN and intra-BAN and inter-BAN) without concern for the order;

if relative positioning is desired, choose a combination of intra-BAN and inter-BAN schemes.

FIGS. 12a and 12b present curves illustrating the improvement in the location accuracy obtained by a device according to the invention using cooperative linkups within a BAN, stated otherwise a cooperative method of intra-BAN type. Considered in the example is a wireless body network (that is to say a BAN), moving around indoors according to a realistic mobility model.

The BAN consists of a variable number of wireless sensors, and where each sensor, in addition to carrying out measurements of distance to anchors, implements three location protocols:

the first protocol utilizes the spatial diversity of the sensors situated on a person, but does not implement an Intra-BAN cooperation (no measurements of distance between the sensors);

the second protocol implements an Intra-BAN cooperation scheme with selective distance measurements (measurements of distance between a subset of sensors);

the third protocol implements an Intra-BAN cooperation scheme with exhaustive measurements of distance between all the possible pairs of sensors.

In the example, the global position of the BAN is estimated by calculating the barycenter of the estimated coordinates of the nodes constituting the body network.

More precisely, FIG. 12a presents the mean error of location of a BAN as a function of the number of sensors per BAN (from two to sixteen), and FIG. 12b presents the mean error of positioning of a BAN as a function of the error in estimating the time of flight (from 1 cm to 15 m). The solid curves 1211, 1221 illustrate the case of a BAN not benefiting from a cooperative method of intra-BAN type, the dashed curves 1212, 1222 illustrate the case of a BAN benefiting from a cooperative method of exhaustive intra-BAN type, and the curves 1213, 1223 illustrate the case of a BAN benefiting from a cooperative method of selective intra-BAN type. The exhaustive approach leads to a consideration of all the measurements of distances available and the algorithm chosen to position the nodes is applied to all the nodes; stated otherwise in the exhaustive approach, even the nodes having an insufficient number of distance measurements (for example, less than or equal to two in the plane) are positioned, and this may lead to errors. On the contrary, in the selective approach, only the nodes having a sufficient number of distance measurements (greater than or equal to three in the plane, for example) are positioned; the others are not positioned. The selective approach thus makes it possible to obtain a more accurate positioning by comparison with the exhaustive approach.

As illustrated by FIG. 12a, the more the number of sensors of the BAN increases, the more the body network positioning error decreases. Moreover, FIGS. 12a and 12b show that a cooperation of intra-BAN type, of selective or exhaustive type, makes it possible to considerably improve the accuracy of global location of the BAN. This improvement is notably due to better utilization of spatial diversity, and of information redundancy, by virtue of the multiplicity of distance measurements. The redundancy results from the fact that multiple measurements of distances associated with various linkups, but involving one or more same nodes, comprise a quantity of mutual information relating to the positions of these nodes (that is to say one and the same position possibly occurring in several distances). Spatial diversity is obtained naturally by distributing several objects (transmitters and/or receivers) per mobile body, thus ensuring statistically independent radio linkups exhibiting different propagation conditions (that is to say for linkups from a node to multiple neighboring nodes, or else linkups from multiple nodes to one and the same neighboring node). Thus, for example, if one of the objects is masked with respect to an anchor, there may exist another object visible from this same anchor, thus making it possible to obtain a distance measurement up to the anchor. Hence, the higher the number of objects per body, the higher the success rate of the distance measurements.

FIG. 12c presents curves illustrating the improvement in the success rate in locating the nodes of a BAN by virtue of a device according to the invention using cooperative linkups within a BAN. The location of a node is considered to be a success if the positioning error is less than a certain threshold defined according to the application aimed at (in the example of FIG. 12c, the threshold is defined at 2 m). A first curve 1231 illustrates the case of a BAN without a cooperative method, a second curve 1232 illustrates the case of a BAN with a cooperative method of selective type and a third curve 1233 illustrates the case of a BAN with an exhaustive cooperative method. FIG. 12c shows that a cooperation of intra-BAN type makes it possible to improve the coverage rate, especially for a time of flight estimation error of greater than 50 cm.

FIG. 12d presents curves illustrating the lag required to determine the position of the nodes of a BAN as a function of the procedure used. The example of FIG. 12d corresponds to exchanges of "3-way ranging" type and of a protocol layer or "Medium Access Control" (MAC) of 802.15.4 "beacon-enabled" type. Note that only the lags related to the acquisition of the measurements of distances required for positioning are taken into account and that the processing time, which is contingent on the choice of the algorithm and the calculation platform, does not enter into consideration here. A protocol layer of this type is based on the presence of a coordinator node, which periodically transmits a "beacon" (stated otherwise, a specific signalling and synchronization packet) so as to delimit the start of the super-frame for the base nodes (once synchronized with this beacon), and to coordinate the transmissions of the nodes inside this super-frame. The MAC layers of beacon-enabled type have notably formed the subject of the following publication: M. Maman, F. Dehmas, R. D'Errico, and L. Ouvry, "Evaluating a TDMA MAC for Body Area Networks Using a Space-time Dependent Channel Model," The 20th Personal, Indoor and Mobile Radio Communications Symposium (PIMRC 2009), Tokyo, Japan, September 2009.

Since the distance measurements are obtained by virtue of a transmission of signals (or of packets) between nodes, the location protocols have a non-negligible impact on the performance obtained at the level of the medium access protocol (layer 2 of the OSI model), and notably in terms of availability of the measurements of radiolocation metrics (for example, the allocation of resources for point-to-point distance measurements on the basis of the estimation of the TOA of packets exchanged in the protocol schemes of "two-way ranging" type) and/or of refresh rates for these same measurements.

A first curve 1241 illustrates the case of a BAN without a cooperative method, a second curve 1242 illustrates the case of a BAN with a cooperative method of selective type and a third curve 1243 illustrates the case of a BAN with an exhaustive cooperative method. FIG. 12d shows that for the Intra-BAN cooperation of exhaustive type, the data acquisition lag is very long, and could even turn out to be prohibitive for real-time applications of "pedestrian navigation" type. On the other hand, the implementation of a selective Intra-BAN cooperation according to the invention is in essence parsimonious in the sense that it enables an energy saving, by mobilizing limited resources (that is to say a number of radio linkups or measurements enabled by the allocation of dedicated time intervals), only if these resources turn out to be necessary. This approach makes it possible, in the example provided, to halve the lag obtained.

FIGS. 13a and 13b present curves illustrating the improvement in the rate of locating the nodes of a BAN obtained by a device according to the invention using cooperative linkups in one or more close BANs. For these examples, a group of wireless body networks is considered, moving around inside an indoor environment in accordance with a realistic group mobility model.

In the case of FIG. 13a, the error in estimating the time of flight is considered to be equal to 3 cm, while for FIG. 13b, the error in estimating the time of flight is considered to be equal to 3 m. The ordinate axis represents the percentage of BANs which have not succeeded in positioning themselves (without taking into account a maximum threshold for the positioning error), the abscissa axis representing the number of BANs per group, varying from two to sixteen.

A first curve 1311, 1321 illustrates the case of a BAN without a cooperative method, a second curve 1312, 1322 illustrates the case of a BAN with a cooperative method of "1 to n" type and a third curve 1313, 1323 illustrates the case of a BAN with a cooperative method of "n to n" type. It is apparent in FIGS. 13a, 13b that without inter-BAN cooperations, the failure rate of the positioning is on average equal to 25%. By implementing inter-BAN cooperation schemes, this rate decreases to below 20% for cooperation of "1-to-1" type, and to below 10% for cooperation of "n-to-n" type.

FIGS. 13c and 13d present graphics illustrating the improvement in the success rate in locating the nodes of a BAN by virtue of a device according to the invention using cooperative linkups in one or more close BANs. The ordinate axis represents the positioning rate obtained, the abscissa axis representing the number of BANs per group. In the case of FIG. 13c, the error in estimating the time of flight is considered to be equal to 3 cm, while for FIG. 13d, the error in estimating the time of flight is considered to be equal to 3 m.

A first histogram 1331, 1341 illustrates the case of a BAN with a cooperative method of "1 to n" type and a third curve 1332, 1342 illustrates the case of a BAN with a cooperative method of "n to n" type. FIGS. 13c and 13d highlight the gain obtained by virtue of an Inter-BAN cooperation, with respect to the case without Inter-BAN cooperation, in terms of positioning success rate. The gain that can be obtained by virtue of these Inter-BAN cooperation schemes, varies from 10% to 90% with respect to the case without cooperation. This gain depends notably on the number of BANs per group and the mode of cooperation "1-to-1" or "n-to-n".

According to an implementation of the method according to the invention, the method also comprises a step of measuring time of flight of an indirect path of ultra wideband signal transmitted between a first node of a BAN and a second node, the said path arising from a single reflection on a surface external to the mobile body supporting the BAN, between the first node and the second node, the second node belonging, by choice, to:
 a the BAN bearing the first node;
 a fixed apparatus remote from the said body;
 a second BAN.

An advantage of performing one or more measurements of indirect path time is to make the location system benefit, at lesser cost, from additional measurements related to reflections, notably so as to:

remove the geometric ambiguities which may appear when the measurements of distances are incomplete;
improve the accuracy of the positioning by virtue of the redundancy and the richness of the measurements obtained; or
allow relative positioning as a function of geometric and/or biomechanical constraints of the body.

A few terms and expressions used subsequently are now defined. The expression "simple reflection" is understood to mean a single reflection, as opposed to a signal reflected several times in succession. The expression "time-reproducible reflection" is understood to mean a reflection which, all things being equal moreover, can be reproduced identically over time, whenever the reflected signal is re-transmitted. The expression "space-reproducible reflection" is understood to mean a reflection which can be reproduced identically in space (according to the element mobility), whenever a signal is re-transmitted. This is notably the case for a floor or ceiling reflection. This reproducibility also involves the possibility of bounding or of predicting the instant (or the temporal period) of reception of a wave path. The expression "tracking algorithm" is understood to mean an algorithm which allows the tracking, for example, of a position (or of one or more paths, or of a speed, or of an acceleration), over time (for example dynamic location). An example of such an algorithm is the Kalman filter.

The examples given subsequently are illustrated with human bodies, but other types of bodies, organic or inorganic (such as robots or self-guided vehicles) could be employed.

FIG. 14 presents a schematic illustrating two main phases 1501, 1502 of a method according to the invention utilizing a measurement of indirect path time.

The first phase 1501 utilizes a UWB receiver able to restore an image of the multi-path channel, stated otherwise capable of estimating the impulse response of the wave propagation channel, and executes an algorithm for estimating the times of arrival of at least one path arising from a simple and time-reproducible and space-reproducible reflection, for example, a reflection on the floor, a ceiling, or indeed on walls or furniture. The first phase 1501 therefore provides, on the basis of the radioelectric signals 1511 received by a node, one or more estimations $TOA_1, \ldots, TOA_n$ of time of arrival each corresponding to a wave path, at least one path from among these paths being an indirect (or secondary) path.

Thereafter, the second phase 1502 utilizes, through a positioning and/or tracking algorithm, the estimations $TOA_1, \ldots, TOA_n$ of time of arrival so as to track or position, relatively or absolutely, the node that it is sought to locate.

The first phase 1501 is now detailed. It is possible to distinguish two categories of techniques for the reception of a UWB signal: coherent reception and non-coherent reception.

The coherent reception technique can rely on a sliding correlation. It makes it possible to obtain quasi-optimal performance. A very short observation window is positioned as a function of the instant of arrival of a pulse, and a calculation of the correlation rate between the signal received and a pattern (or an estimation of the signal transmitted) is carried out. This technique can, in certain cases, be fairly complex and requires fairly strong synchronization constraints, not well suited to energy-constrained systems.

The non-coherent reception technique performs a detection of energy of the signal received, by comparing the amplitude of the envelope of the signal with a given threshold. At least two variants of this technique are possible, as a function of the signal power integration interval. According to a first variant, the integration is performed over the duration of the temporal spread of the multi-paths, also called RMS Delay Spread of the impulse response of the channel (i.e. about 20 to 80 ns indoors). According to a second variant, the integration is performed on the scale of the UWB pulse transmitted (i.e. about a few ns). The first variant makes it possible to recover the maximum of energy and is therefore more suited to communication applications, whilst the second procedure allows better utilization of the high temporal resolution of the UWB signals and is therefore more suited to channel location or estimation applications.

It is important that the reconstruction of the image of the multi-path propagation channel at the level of the UWB receiver is sufficiently accurate to be able to perform the analysis of the radio link between the transmitter node and the UWB receiver node. Hence, whatever technique is adopted, at the end of this first step of receiving the radioelectric signals 1511, the UWB receiver node must have in baseband an image of the multi-path channel corresponding to the radio linkup considered between two UWB transmitter/receiver nodes, and be capable of extracting the times of arrival corresponding, respectively, to the direct path and to the paths related to reproducible reflections.

FIG. 15 presents an embodiment of an ultra wideband receiver implemented by the method utilizing at least one measurement of indirect path time. The receiver 1600 comprises a first amplification module 1601 amplifying the signal received and feeding a module for conversion to baseband 1602, which provides the signal received frequency-transposed to an analogue-digital converter 1603 sampling the signal at at least the Nyquist frequency. The analogue-digital converter 1603 feeds a module for estimating the impulse response 1604, on the one hand, and a RAKE receiver 1605 on the other hand. The RAKE receiver (or finger-type receiver) is an optimal receiver (containing a filter matched to the channel) which on the one hand makes it possible to counter the effects of multi-paths by combining in phase several echoes received, and on the other hand to increase the signal-to-noise ratio (SNR), thus improving the detectability/synchronization/demodulation of the signal. The signal arising from the RAKE receiver is thereafter decoded in the block 1607 so as to recover the useful data which have been transmitted. In parallel, the analogue-digital converter 1603 also feeds a module for the estimation of the channel impulse response 1604, which is thereafter utilized by a module for extracting the paths 1606.

The step 1606 of extracting the times of arrival, corresponding to the direct path and to a set of reproducible indirect paths (reflection from floor, ceiling, etc.) can be difficult, notably in the context of the wireless body networks which are characterized by a very high rate of radio linkups in an obstruction situation, that is to say in a NLOS situation.

Known algorithms make it possible to estimate the times of arrival related to the direct paths. It is notably possible to cite the generalized maximum likelihood (GML) algorithm which is based on the CLEAN algorithm published in J. Hogborn, "Aperture Synthesis with a Non-Regular Distribution of Interferometer Baselines", Astron. and Astrophys. Suppl. Ser, vol. 15, 1974.

Moreover, the extraction of the paths arising from simple and reproducible reflections can be facilitated, for example by applying a windowing or a path tracking, on the basis of the knowledge of the temporal position of the direct path (on the basis of the last available location or synchronization), and/or of a priori knowledge of the geometry of the environment, and/or of geometric and bio-mechanical constraints, for example, the disposition of the transmitter and/or receiver nodes on a body, as well as the height of the body in relation to the ground. The windowing consists in selecting only a part of the impulse response of the channel. Indeed, by virtue of the knowledge of the height of the mobile body (or of the wireless node) and of the nature of the reflection (floor, ceiling, etc.), the maximum distance that can be traversed by such a reflected path, is determined. It is henceforth possible to apply a temporal windowing to the impulse response of the channel, so as to exclude the irrelevant paths. The extraction of the secondary paths arising from simple reflections can also be carried out by virtue of a tracking algorithm, which on the basis of the knowledge of the previous temporal positions (estimated previously) of these paths, estimates the current positions of these paths.

It should be noted that during the step of extracting the paths, it is also possible to seek to exploit radio metrics, such as for example the "RMS delay spread", so as to facilitate the discrimination between the LOS and NLOS situations, and/or to assist and improve the accuracy of the positioning algorithms. This "Delay Spread" metric makes it possible to assess the significant temporal spreading, or dispersion of the delays, related to multi-paths. This spreading tends to increase under a condition of obstruction of the radio linkups, or NLOS, and constitutes a tool for deciding the state of the channel.

The second phase 1502 (cf. FIG. 14) utilizes the measurements of the times of arrival, $TOA_1 \ldots TOA_n$, arising from the first phase 1501 and corresponding to the direct path and to a set of simple and time-reproducible and space-reproducible reflections, to position or track the nodes of one or more mobile body networks.

By way of nonlimiting illustration, the times of arrival considered subsequently are those related to the direct paths and to the paths arising from reflections on the ground, even if other types of paths may be taken into account such as for example reflections on a ceiling or, by assuming that the nodes have pre-knowledge of the environment, reflections in relation to other obstacles such as walls or surrounding objects.

FIG. 16 illustrates an exemplary indirect path caused by a ground reflection. A radioelectric signal is transmitted by a transmitter node 1701 to a receiver node 1702. A first path 1711 between the two nodes 1701, 1702 is the direct path, stated otherwise, a straight segment linking the two nodes. A second path 1712, represented in FIG. 16 by an alternation of points and of lines, is an indirect path arising from a reflection on the ground 1720. Recall that the angle of incidence 01 of the second path 1712 on the ground is equal to the angle of reflection 82.

By virtue of the use of a UWB receiver, such as described above, the receiver node 1702 is capable of estimating at least part of the impulse response of the channel and of extracting the times of arrival, $TOA_1$ and $TOA_2$, corresponding respectively to the direct path 1711 and to the indirect path 1712.

By considering coordinates expressed in a 3D reference frame, and by assuming that the nodes are synchronized, the relation between the times of arrival, and the distances and coordinates of the nodes can be expressed as follows:

$$D_1 = \sqrt{D_0^2 + (h_2 - h_1)^2} \approx TOA_1 \times c$$

$$R_1 = \sqrt{D_0^2 + (h_2 + h_1)^2} \approx TOA_2 \times c$$

where:
$D_0$ represents the ground distance between the transmitter 1701 and the receiver 1702;
$D_1$ represents the length of the direct path 1711;
$R_1$ represents the length of the indirect path 1712;
c represents the speed of the electromagnetic waves;

TOA$_1$ and TOA$_2$ are the measured times of arrival which correspond to the times of flight of the signals which propagate along the first path 1711 and the second path 1712.

h$_1$ and h$_2$ are the respective heights at which the transmitter 1701 and the receiver 1702 are situated.

This example can be extended to the case of asynchronous systems, in which case the times of flight are estimated by means of a protocol of N-Way ranging type (such as published, for example in D. Macagnano and Al., "MAC Performance for Localization and Tracking in Wireless Sensor Networks", In Proceedings of the 4th Workshop on Positioning, Navigation and Communication (WPNC), March 2007), in addition to the estimation of the times of arrival.

At this juncture, the receiver node 1702 can utilize these two distance measurements to refine the calculation of its absolute or relative position in relation to the transmitter node 1701.

The positioning and/or tracking algorithm takes as input the various distance measurements and associated metrics, and provides as output the information required (relative positions, absolute positions, for example) for a given application (navigation, positioning, motion capture, for example). Several algorithms can be employed to perform the positioning or the tracking of the receiver node 1702, notably nonlinear optimization algorithms, the linearized least squares procedure, trilateration procedures, Kalman filters (including Extended Kalman Filters, or EKF) and particle filters.

Several implementations of the method according to the invention utilizing a measurement of indirect path time are now illustrated in a neither restrictive nor exhaustive manner. For the sake of simplification, it will be considered subsequently that the indirect paths are due to reflections on the ground.

FIGS. 17*a* and 17*b* illustrate a first implementation of a method according to the invention utilizing a measurement of indirect path time, in which the positioning of a second node 1802 attached to a body is performed in relation to a first node 1801 attached to the same body.

In the example, the nodes 1801, 1802 are attached to a human body 1800 in motion. The position of the first node 1801 is assumed known in a reference datum local to the body or in relation to an existing arbitrary reference datum. The first node 1801 transmits a signal to the second node 1802. The second node 1802 executes the method according to the invention by estimating, on the one hand, the length D$_1$ of the direct path and, on the other hand, the length R$_1$ of the indirect path resulting from a reflection on the ground 1840.

In the example, the measurement of length of the indirect path R$_1$ corresponding to the reflection on the ground 1840 corresponds to about twice the height of the first node 1801. It can then be deduced that the second node 1802 is situated in proximity to the horizontal plane passing through the first node 1801. Moreover, as the measurement of length D$_1$ of the direct path is greater than the width of the hip of the body, it can be deduced that the second node 1802 is situated at the level of the wrist to the right of the first node 1801.

Thus, as illustrated by FIG. 17*a*, measurement of only the length D$_1$ of the direct path would not have made it possible to position the second node 1802, since the second node 1802 could have been situated on the surface of a sphere 1811 of radius D$_1$ centerd on the first node 1801, represented dashed in FIG. 18*a*. By virtue of the taking into account, for the same radio linkup, of an additional time of flight measurement due to the reflection on the ground, the second node 1802 has further information that it can utilize to deduce its relative or absolute position, by virtue of geometric and/or biomechanical relations and constraints. As illustrated in FIG. 17*b*, the second node 1802 is situated at the intersection of a first sphere 1811 of radius D$_1$ centerd on the first node 1801 with a second sphere 1812 centerd on the point of reflection 1850 on the ground 1840. It should obviously be noted that the higher the number of measurements of time of flight of paths (direct and indirect), the more favorable in respect of accurate positioning of the second node 1802.

It should be noted that according to another implementation of the method according to the invention, it is the second node 1802 which transmits a signal to the first node 1801, it then being possible for the time of flight associated with the path to be retransmitted to the second node 1802 through another communication link.

FIGS. 18*a* and 18*b* illustrate a second implementation of a method according to the invention utilizing at least one measurement of indirect path time. In the example, three nodes 1901, 1902, 1903 are attached to a human body 1900. The first node 1901 and the third node 1903 have already known positions. The method is used to position the second node 1902 with respect to the first and third nodes 1901, 1903.

The first node 1901 transmits a signal to the second node 1902 and the third node 1903 also transmits a signal to the second node 1902. The second node 1902 thereafter executes the method according to the invention by estimating the length D$_1$ of the direct path between the first node 1901 and the second node 1902, the length R$_1$ of the indirect path between the first node 1901 and the second node 1902, resulting from a reflection on the ground 1940, and the length D$_3$ of the direct path between the third node and the second node 1902.

As illustrated in FIG. 18*a*, measurements of only the length of direct paths D$_1$ and D$_3$ do not make it possible to accurately estimate the position of the second node 1902, since certain geometric ambiguities persist. In the example of FIG. 18*a*, the second node 1902 can be positioned at the level of the circle marking the intersection of two spheres, the first sphere 1911 being of radius D$_1$ and centerd on the first node 1901, the second sphere 1912 being of radius D$_3$ and centerd on the third node 1903. By virtue of the additional measurement of the length R$_1$ of the indirect path, the second node 1902 can be more accurately positioned by removing certain geometric ambiguities, since a new positioning constraint is added in the form of a surface of a third sphere 1913 centerd on the point of reflection 1950 on the ground.

FIG. 19 illustrates a third implementation of a method according to the invention utilizing at least one measurement of indirect path time, in which a set of nodes attached to one and the same body and whose positions are unknown a priori are positioned in a relative manner.

In the example, three nodes 2001, 2002, 2003 are attached to a human body 2000. The method is used to position each node with respect to the other two. Signals are transmitted between each pair of nodes, and path length measurements are performed, in the example, as follows:

estimate, between the second node 2002 and the third node 2003, the length D$_2$ of the direct path and the length R$_2$ of the indirect path reflected on the ground 2040;

estimate, between the first node 2001 and the third node 2003, the length D$_3$ of the direct path (in the example, no measurement of indirect path is performed between these two nodes);

estimate, between the first node 2001 and the second node 2002, the length R$_1$ of the indirect path reflected on the ground 2040 (in the example, no measurement of direct path is performed between these two nodes).

The utilization of the multi-path diversity of the UWB channel, notably by taking account of the path length $R_1$, $R_2$ measurements related to the reflections on the ground, makes it possible to minimize the geometric ambiguities that could occur if relying only on measurements related to the direct paths. It is thus possible to reconstruct, relatively, the positioning of the nodes, with respect to one another.

This type of purely relative positioning can be useful for numerous applications, such as for example, the reconstruction of the motion of a person, the checking of the attachment of the nodes to the person, the verification of the integrity of the network formed by these nodes.

FIGS. 20a and 20b illustrate a fourth implementation of a method according to the invention utilizing at least one measurement of indirect path time, in which the positioning of a mobile node 2102 is performed in relation to other nodes 2101, 2103 situated within communication range.

In the example of FIG. 20a, a first node 2101 and a second node 2102 are situated on a first human body 2110, and a third node 2103 is situated on a second human body 2120, within communication range of the second node 2102. The positions of the first node 2101 and of the third node 2103 are known. One seeks to position the second node 2102. Accordingly, path length measurements are performed, as follows:

estimate, between the first node 2101 and the second node 2102, the length $D_1$ of the direct path and the length $R_1$ of the indirect path reflected on the ground 2140 (intra-BAN measurements);

estimate, between the third node 2103 and the second node 2102, the length $D_3$ of the direct path and the length $R_3$ of the indirect path reflected on the ground 2140 (inter-BAN measurements).

All the measurements performed in the example of FIG. 20a are due to transmissions of signals between the nodes of the same body network (BAN related to the first human body 2110); these measurements $D_1$, $R_1$, $D_3$, $R_3$ are called intra-BAN measurements and are utilized to position the second node 2102.

In the example of FIG. 20b, a first node 2101, a second node 2102 and a third node 2103 are situated on a first body 2110 which moves around within communication range of a fixed base station 2130, which is also called an "anchor". The base station 2130 comprises a node 2104. One seeks to determine the absolute position of the second node 2102. Accordingly, path length measurements are performed, as follows:

estimate, between the first node 2101 and the second node 2102, the length $D_1$ of the direct path and the length $R_1$ of the indirect path reflected on the ground 2140 (intra-BAN measurements);

estimate, between the third node 2103 and the second node 2102, the length $D_3$ of the direct path and the length $R_3$ of the indirect path reflected on the ground 2140 (intra-BAN measurements);

estimate, between the node 2104 of the anchor 2130 and the second node 2102, the length $D_4$ of the direct path and the length $R_4$ of the indirect path reflected on the ground 2140 (anchor-BAN measurements).

Here again, the second node 2102 can, by using a positioning or tracking algorithm (for example a trilateration procedure, the least squares procedure, a filtering), utilize the measurements of lengths $R_1$, $R_2$, $R_3$, of indirect paths to improve the accuracy of its positioning.

The method and the device according to the invention can be employed, for example, in military applications, security or rescue applications, for which cost or consumption are not limiting factors. More broadly, the method and the device according to the invention are usable in devices intended for the general-public, for example for motion capture, posture detection, navigation, augmented social networks calling upon the point-to-point linkups between a pair of objects, and geo-located services. By way of illustration, the device according to the invention can allow the location of groups of mobile people moving around inside buildings where satellite location devices are unusable, such as for example commercial centers, airports, museums, industrial sites, or offices. It can allow users to be situated in a zone and, for example, to determine itineraries of interest or to benefit from augmented-reality techniques.

The invention claimed is:

1. A method of cooperative location of a plurality of nodes possessed by a first mobile body comprising several nodes for the transmission and/or reception of a signal by wireless means, the method comprising, for at least one first node from among the said nodes, a step of measurements of distances separating the said first node from second nodes by using the said wireless means, each of the said second nodes being possessed by one of the following distinct type entities, by choice:

the first mobile body, a remote fixed apparatus situated within transmission range of the said mobile body, a second mobile body, remote and situated within transmission range of the first mobile body, at least two nodes from among all the said second nodes used to perform the said distance measurements being possessed by two entities of distinct types and/or by the said second mobile body, the method comprising a step of utilizing the said measurements to locate at least the said first node at least in relation to a subset of the said second nodes, the method furthermore comprising a step of locating at least one other of the said nodes possessed by the body by utilizing at least one measurement of distance separating this other node from a third node, it being possible for this third node to be the said first node.

2. The method of cooperative location as claimed in claim 1, in which a first step is executed to measure distances between the first node and second nodes already positioned and possessed by entities remote from the first mobile body, a second step being executed to estimate the position of the said first node on the basis of the said measurements, a third step being executed if it has not been possible to determine the position of the said first node according to the desired accuracy on completion of the second step, the third step comprising at least one measurement of distance between the first node and at least one other node possessed by the first mobile body and positioned on completion of the first step, the position of the said first node then being estimated on the basis of the measurements of distances arising from the first step and from the third step.

3. The method of cooperative location as claimed in claim 1, in which a first step comprises the taking of measurements of distances between the first node and second nodes, at least one second node being possessed by the first mobile body, at least one other second node being possessed by an entity remote from the first mobile body, the method executing a second step to estimate the position of the first node on the basis of the said measurements of distances.

4. The method of cooperative location as claimed in claim 1, in which at least one measurement is performed of time of flight of an indirect path of ultra wideband signal transmitted between the first node and a second node, the said path arising from a single reflection, between the first node and the second node, on a surface external to the body comprising the first node, the second node belonging, by choice, to:

the first mobile body;

a fixed apparatus, remote and situated within transmission range of the said mobile body;

a second mobile body, remote and situated within transmission range of the first mobile body;

utilizing the said time of flight measurement to locate the first node at least with respect to the second node.

5. The method as claimed in claim 1, in which the measurements of distances are performed by measurement of the time of arrival of a signal transmitted between the first node and a second node, the first node and the second node being synchronized, or of an exchange of signals transmitted between the first node and a second node, the first node and the second node being asynchronous.

6. A method of cooperative location of a mobile body, the method comprising, for several nodes of the said body, a first step of cooperative location of node as claimed in claim 1, so as to estimate the position of the said nodes, and a second step of utilizing the said positions to locate the said mobile body.

7. A system suitable for the implementation of the method as claimed in claim 1, the system comprising a first mobile body comprising several nodes from among which at least one node is able to transmit signals, for example an ultra wideband radiofrequency transmitter, the said node being within transmission range of at least one second node comprising a receiver able to receive the signals transmitted by the said transmitter, the first mobile body comprising means for calculating a position of the transmitter node.

8. A system suitable for the implementation of the method as claimed in claim 1, the system comprising a first mobile body comprising several nodes from among which at least one node is able to receive signals, for example an ultra wideband radiofrequency receiver, the said node being within transmission range of at least one second node comprising a transmitter of signals, the system comprising means for calculating the position of the receiver node.

* * * * *